United States Patent
Mukai

(10) Patent No.: US 8,407,983 B2
(45) Date of Patent: Apr. 2, 2013

(54) ABNORMALITY DIAGNOSIS DEVICE OF INTERNAL COMBUSTION ENGINE

(75) Inventor: Yasuo Mukai, Kariya (JP)

(73) Assignee: Denso Corporation, Kariya (JP)

(*) Notice: Subject to any disclaimer, the term of this patent is extended or adjusted under 35 U.S.C. 154(b) by 1118 days.

(21) Appl. No.: 12/277,663

(22) Filed: Nov. 25, 2008

(65) Prior Publication Data

US 2009/0139213 A1 Jun. 4, 2009

(30) Foreign Application Priority Data

Nov. 30, 2007 (JP) .................................. 2007-310287

(51) Int. Cl.
*F01N 3/00* (2006.01)
*F02B 27/04* (2006.01)

(52) U.S. Cl. ................. 60/277; 60/285; 60/273

(58) Field of Classification Search .................... 60/277, 60/285

See application file for complete search history.

(56) References Cited

U.S. PATENT DOCUMENTS

| 5,191,762 | A | * | 3/1993 | Kuroda et al. | 60/276 |
|---|---|---|---|---|---|
| 5,381,657 | A | * | 1/1995 | Takizawa et al. | 60/276 |
| 5,610,321 | A | | 3/1997 | Shinmoto | |
| 5,636,514 | A | * | 6/1997 | Seki | 60/277 |
| 5,737,916 | A | * | 4/1998 | Mitsutani | 60/277 |
| 5,806,306 | A | * | 9/1998 | Okamoto et al. | 60/277 |
| 5,966,930 | A | * | 10/1999 | Hatano et al. | 60/276 |
| 6,018,945 | A | * | 2/2000 | Nakagawa | 60/285 |
| 6,073,440 | A | * | 6/2000 | Douta et al. | 60/277 |
| 6,295,807 | B1 | | 10/2001 | Douta et al. | |
| 6,505,594 | B1 | * | 1/2003 | Katayama et al. | 123/179.18 |
| 2005/0022510 | A1 | * | 2/2005 | Nakagawa et al. | 60/285 |
| 2007/0251213 | A1 | * | 11/2007 | Saito et al. | 60/277 |

FOREIGN PATENT DOCUMENTS

| JP | 05-099039 | | 4/1993 |
|---|---|---|---|
| JP | 5-171923 | | 7/1993 |
| JP | 2001304018 A | * | 10/2001 |
| JP | 2005-291101 | | 10/2005 |

OTHER PUBLICATIONS

JP2005-291101A English Translation (Orginial Copy submited by applicant Jun. 7, 2011).*
JP2001-304018A English Translation.*
Japanese Office Action dated May 2, 2011; issued in corresponding Japanese Application No. 2007-310287 with English Translation.

* cited by examiner

*Primary Examiner* — Thomas Denion
*Assistant Examiner* — Anthony Ayala Delgado
(74) *Attorney, Agent, or Firm* — Nixon & Vanderhye P.C.

(57) ABSTRACT

A deviation amount of a downstream air-fuel ratio sensed with a downstream air-fuel ratio sensor, which senses an air-fuel ratio of exhaust gas downstream of a catalyst, from a target air-fuel ratio is integrated during a period in which the downstream air-fuel ratio continuously shows deviations from the target air-fuel ratio while main feedback control and sub feedback control are performed based on outputs of an upstream air-fuel ratio sensor and the downstream air-fuel ratio sensor respectively. The thus-calculated continuous deviation amount of the downstream air-fuel ratio (deterioration degree of exhaust gas purification rate) is compared with an abnormality determination value to determine existence/nonexistence of an abnormal state where the exhaust gas purification rate is deteriorated by an air-fuel ratio variation among cylinders (i.e., state where control center of main feedback control has shifted).

6 Claims, 9 Drawing Sheets

ABNORMALITY DIAGNOSIS DEVICE OF INTERNAL COMBUSTION ENGINE

CROSS REFERENCE TO RELATED APPLICATION

This application is based on and incorporates herein by reference Japanese Patent Application No. 2007-310287 filed on Nov. 30, 2007.

BACKGROUND OF THE INVENTION

1. Field of the Invention

The present invention relates to an abnormality diagnosis device of an internal combustion engine having sensors for sensing an air-fuel ratio or a rich/lean state of exhaust gas, the sensors being arranged respectively upstream and downstream of a catalyst, which is used for purifying exhaust gas.

2. Description of Related Art

Aiming to improve an exhaust gas purification rate, there is a control system of an internal combustion engine mounted in a recent vehicle that has sensors (air-fuel ratio sensors or oxygen sensors) for sensing an air-fuel ratio or a rich/lean state of exhaust gas such that the sensors are arranged respectively upstream and downstream of a catalyst, which is used for purifying exhaust gas. The control system performs main feedback control for performing feedback correction of a supply air-fuel ratio (e.g., a fuel injection quantity) to conform the air-fuel ratio of the exhaust gas upstream of the catalyst to an upstream target air-fuel ratio based on an output of the upstream sensor. In addition, the control system performs sub feedback control for performing feedback correction of a control amount related to the main feedback control (for example, the upstream target air-fuel ratio or a main feedback correction amount) to conform the air-fuel ratio of the exhaust gas downstream of the catalyst to a downstream target air-fuel ratio based on an output of the downstream sensor.

Patent document 1 (Japanese Patent Gazette No. 3438298) describes an abnormality diagnosis of a system that performs the main feedback control and the sub feedback control. In the abnormality diagnosis described in Patent document 1, at least one of time in which output voltage of the downstream sensor is equal to or higher than a predetermined upper limit and time in which the output voltage is equal to or lower than a predetermined lower limit is integrated. When the integrated time does not reach a predetermined value within a specified time, it is determined that output fluctuation of the downstream sensor has become equal to or lower than a predetermined value, and it is determined that the downstream sensor is abnormal.

There is a possibility that variation (imbalance) is caused in the air-fuel ratio among cylinders of the internal combustion engine due to an error of fuel injection quantity of the cylinder, an error of air changing quantity of the cylinder and the like. If the air-fuel ratio variation among the cylinders increases in the system that performs the main feedback control and the sub feedback control as described above, fluctuation of the air-fuel ratio of the exhaust gas passing through the upstream sensor increases and deviation of the air-fuel ratio sensed with the upstream sensor from an average air-fuel ratio of all the cylinders increases. Therefore, in some cases, a control center of the main feedback control shifts and the air-fuel ratio of the exhaust gas flowing into the catalyst goes out of a purification window of the catalyst. As a result, there is a possibility that an exhaust gas purification rate of the catalyst deteriorates and the exhaust emission deteriorates.

In recent years, it has been increasingly required to detect an abnormal state, in which the control center of the main feedback control shifts due to the air-fuel ratio variation among the cylinders and the exhaust gas purification rate deteriorates, in an early stage. The technology described in Patent document 1 detects the abnormality of the downstream sensor in the system that performs the main feedback control and the sub feedback control. However, the technology cannot detect an abnormal state where the exhaust gas purification rate is deteriorated by the air-fuel ratio variation among the cylinders (i.e., the state where the control center of the main feedback control has shifted).

SUMMARY OF THE INVENTION

It is an object of the present invention to provide an abnormality diagnosis device of an internal combustion engine capable of detecting a abnormal state where an exhaust gas purification rate is deteriorated by an air-fuel ratio variation among cylinders.

According to an aspect of the present invention, an abnormality diagnosis device of an internal combustion engine that has a catalyst provided in an exhaust passage of the internal combustion engine for purifying exhaust gas, an upstream sensor provided upstream of the catalyst for sensing an air-fuel ratio or a rich/lean state of the exhaust gas and a downstream sensor provided downstream of the catalyst for sensing the air-fuel ratio of the exhaust gas and that performs air-fuel ratio feedback control for correcting a supply air-fuel ratio based on at least an output of the upstream sensor has an exhaust gas purification rate deterioration degree determining section and an abnormality diagnosing section.

The exhaust gas purification rate deterioration degree determining section determines a deterioration degree of an exhaust gas purification rate based on an integrated value of a deviation amount of a downstream air-fuel ratio, which is sensed with the downstream sensor, from a target air-fuel ratio.

The abnormality diagnosing section determines whether there exists an abnormal state where the exhaust gas purification rate is deteriorated by a variation in the air-fuel ratio among cylinders based on the deterioration degree of the exhaust gas purification rate determined by the exhaust gas purification rate deterioration degree determining section.

In the case of the system having the downstream sensor (the air-fuel ratio sensor) provided downstream of the catalyst for sensing the air-fuel ratio of the exhaust gas, if the control center of the air-fuel ratio feedback control shifts due to the variation in the air-fuel ratio among the cylinders and the exhaust gas purification rate of the catalyst deteriorates, the deviation of the air-fuel ratio of the exhaust gas, which flows out of the catalyst, from the target air-fuel ratio increases correspondingly, so the deviation amount of the downstream air-fuel ratio (i.e., the deviation amount of the air-fuel ratio sensed with the downstream sensor from the target air-fuel ratio) increases. Therefore, by using the deterioration degree of the exhaust gas purification rate calculated based on the integrated value of the deviation amount of the downstream air-fuel ratio, it can be accurately determined whether there exists the abnormal state where the exhaust gas purification rate is deteriorated by the air-fuel ratio variation among the cylinders (i.e., the state where the control center of the air-fuel ratio feedback control has shifted). As a result, the abnormal state where the exhaust gas purification rate is deteriorated by the air-fuel ratio variation among the cylinders can be detected in an early stage.

According to another aspect of the present invention, the exhaust gas purification rate deterioration degree determining section calculates the deterioration degree of the exhaust gas purification rate by integrating the deviation amount of the downstream air-fuel ratio during a period in which the air-fuel ratio sensed with the downstream sensor continuously shows deviations from the target air-fuel ratio.

As the exhaust gas purification rate of the catalyst is deteriorated more by the air-fuel ratio variation among the cylinders, the period in which the downstream air-fuel ratio (the air-fuel ratio sensed with the downstream sensor) shows deviations from the target air-fuel ratio lengthens and the deviation amount of the downstream air-fuel ratio increases. Therefore, the deterioration degree of the exhaust gas purification rate obtained by integrating the deviation amount of the downstream air-fuel ratio during the period in which such the state continues serves as a parameter accurately reflecting the deterioration degree of the actual exhaust gas purification rate.

According to another aspect of the present invention, the exhaust gas purification rate deterioration degree determining section calculates the deterioration degree of the exhaust gas purification rate by integrating the deviation amount of the downstream air-fuel ratio in a predetermined abnormality diagnosis period.

As the exhaust gas purification rate of the catalyst is deteriorated more by the variation in the air-fuel ratio among the cylinders, the frequency of occurrence of the state where the downstream air-fuel ratio deviates from the target air-fuel ratio in the abnormality diagnosis period increases and the deviation amount of the downstream air-fuel ratio increases. Therefore, the deterioration degree of the exhaust gas purification rate calculated by integrating the deviation amount of the downstream air-fuel ratio in the abnormality diagnosis period serves as the parameter accurately reflecting the deterioration degree of the actual exhaust gas purification rate.

According to another aspect of the present invention, the exhaust gas purification rate deterioration degree determining section calculates the deterioration degree of the exhaust gas purification rate by integrating a product of the deviation amount of the downstream air-fuel ratio and an intake air quantity.

The discharge quantity of the emission (unpurified component) changes in accordance with the deviation amount of the downstream air-fuel ratio and the intake air quantity (i.e., the exhaust gas quantity). Therefore, the deterioration degree of the exhaust gas purification rate calculated by integrating the product of the deviation amount of the downstream air-fuel ratio and the intake air quantity serves as the parameter accurately reflecting the actual emission discharge quantity. Accordingly, it can be accurately determined whether there exits the abnormal state where the exhaust gas purification rate is deteriorated by the air-fuel ratio variation among the cylinders and the emission discharge quantity has actually increased.

According to another aspect of the present invention, the exhaust gas purification rate deterioration degree determining section calculates the deterioration degree of the exhaust gas purification rate by integrating a product of the deviation amount of the downstream air-fuel ratio and the intake air quantity during a period in which the air-fuel ratio sensed with the downstream sensor continuously shows deviations from the target air-fuel ratio.

According to another aspect of the present invention, the exhaust gas purification rate deterioration degree determining section calculates the deterioration degree of the exhaust gas purification rate by integrating a product of the deviation amount of the downstream air-fuel ratio and the intake air quantity in a predetermined abnormality diagnosis period.

In both cases, the deterioration degree of the exhaust gas purification rate accurately reflecting the actual emission discharge quantity can be obtained.

In the case where the deterioration degree of the exhaust gas purification rate is calculated by integrating the deviation amount of the downstream air-fuel ratio in the abnormality diagnosis period or in the case where the deterioration degree of the exhaust gas purification rate is calculated by integrating the product of the deviation amount of the downstream air-fuel ratio and the intake air quantity in the abnormality diagnosis period, according to another aspect of the present invention, the exhaust gas purification rate deterioration degree determining section starts integration processing for calculating the deterioration degree of the exhaust gas purification rate after the air-fuel ratio sensed with the downstream sensor shows deviations from the target air-fuel ratio continuously for a predetermined period in the abnormality diagnosis period.

Thus, when the state where the downstream air-fuel ratio shows deviations from the target air-fuel ratio is eliminated within a period shorter than the predetermined period, it is determined that the deviation of the downstream air-fuel ratio is a temporary deviation due to a noise superimposed on the output of the downstream sensor or a transition (i.e., change in the operation state). Thus, the integration processing for calculating the deterioration degree of the exhaust gas purification rate is prohibited. When the state where the downstream air-fuel ratio shows deviations from the target air-fuel ratio continues for the predetermined period, it is determined that the deviation of the downstream air-fuel ratio is caused by the air-fuel ratio variation among the cylinders, and the integration processing for calculating the deterioration degree of the exhaust gas purification rate is started. Accordingly, the deterioration degree of the exhaust gas purification rate can be accurately calculated without being influenced by the noise or the transition.

According to another aspect of the present invention, an abnormality diagnosis device of an internal combustion engine that has a catalyst provided in an exhaust passage of the internal combustion engine for purifying exhaust gas, an upstream sensor provided upstream of the catalyst for sensing an air-fuel ratio or a rich/lean state of the exhaust gas and a downstream sensor provided downstream of the catalyst for sensing the rich/lean state of the exhaust gas and that performs main feedback control for correcting a supply air-fuel ratio based on an output of the upstream sensor and sub feedback control for correcting a control amount related to the main feedback control based on an output of the downstream sensor has an exhaust gas purification rate deterioration degree determining section and an abnormality diagnosing section.

The exhaust gas purification rate deterioration degree determining section determines a deterioration degree of an exhaust gas purification rate based on a time in which a sub feedback correction amount used in the sub feedback control is guarded with a predetermined guard value.

The abnormality diagnosing section determines whether there exists an abnormal state where the exhaust gas purification rate is deteriorated by a variation in the air-fuel ratio among cylinders based on the deterioration degree of the exhaust gas purification rate determined by the exhaust gas purification rate deterioration degree determining section.

In the case of a system having a downstream sensor (an oxygen sensor) provided downstream of a catalyst for sensing a rich/lean state of exhaust gas, it is difficult to accurately calculate the deviation amount of the downstream air-fuel ratio. If the control center of the main feedback control shifts due to the variation in the air-fuel ratio among the cylinders and the exhaust gas purification rate of the catalyst deteriorates, the deviation of the air-fuel ratio of the exhaust gas, which flows out of the catalyst, from the target air-fuel ratio increases correspondingly so the sub feedback correction amount increases and is guarded with the guard value. Therefore, by using the deterioration degree of the exhaust gas purification rate calculated based on the time during which the sub feedback correction amount is guarded with the guard value, it can be accurately determined whether there exists the abnormal state where the exhaust gas purification rate is deteriorated by the air-fuel ratio variation among the cylinders (i.e., the state where the control center of the main feedback control has shifted). As a result, the abnormal state where the exhaust gas purification rate is deteriorated by the air-fuel ratio variation among the cylinders can be detected in an early stage. Moreover, the oxygen sensor cheaper than the air-fuel ratio sensor can be used as the downstream sensor, satisfying a request for cost reduction.

According to another aspect of the present invention, the exhaust gas purification rate deterioration degree determining section calculates the deterioration degree of the exhaust gas purification rate by measuring a time during which the sub feedback correction amount is continuously guarded with the guard value.

The time in which the sub feedback correction amount is continuously guarded with the guard value extends as the exhaust gas purification rate of the catalyst is deteriorated more by the air-fuel ratio variation among the cylinders. Therefore, the deterioration degree of the exhaust gas purification rate obtained by measuring the time of such the continuous state serves as a parameter accurately reflecting the deterioration degree of the actual exhaust gas purification rate.

According to another aspect of the present invention, the exhaust gas purification rate deterioration degree determining section calculates the deterioration degree of the exhaust gas purification rate by integrating a time during which the sub feedback correction amount is guarded with the guard value in a predetermined abnormality diagnosis period.

As the exhaust gas purification rate of the catalyst is deteriorated more by the variation in the air-fuel ratio among the cylinders, the frequency of occurrence of the state where the sub feedback correction amount is guarded with the guard value increases. Therefore, the deterioration degree of the exhaust gas purification rate calculated by integrating the time during which the sub feedback correction amount is guarded with the guard value in the abnormality diagnosis period serves as the parameter accurately reflecting the deterioration degree of the actual exhaust gas purification rate.

According to another aspect of the present invention, the exhaust gas purification rate deterioration degree determining section calculates the deterioration degree of the exhaust gas purification rate based on a time, during which the sub feedback correction amount is guarded with the guard value, and an intake air quantity.

The emission discharge quantity changes in accordance with the time, in which the sub feedback correction amount is guarded with the guard value, and the intake air quantity (that is, the exhaust gas quantity). Therefore, the deterioration degree of the exhaust gas purification rate calculated based on the time, during which the sub feedback correction amount is guarded with the guard value, and the intake air quantity serves as the parameter accurately reflecting the actual emission discharge quantity. Accordingly, it can be accurately determined whether there exists the abnormal state where the exhaust gas purification rate is deteriorated by the air-fuel ratio variation among the cylinders and the emission discharge quantity has actually increased.

According to another aspect of the present invention, the exhaust gas purification rate deterioration degree determining section calculates the deterioration degree of the exhaust gas purification rate by integrating the intake air quantity during a period, in which the sub feedback correction amount is continuously guarded with the guard value.

According to another aspect of the present invention, the exhaust gas purification rate deterioration degree determining section calculates the deterioration degree of the exhaust gas purification rate by integrating the intake air quantity during a period, in which the sub feedback correction amount is guarded with the guard value, in a predetermined abnormality diagnosis period.

In both cases, the deterioration degree of the exhaust gas purification rate accurately reflecting the actual emission discharge quantity can be obtained.

In the case where the deterioration degree of the exhaust gas purification rate is calculated by integrating the time during which the sub feedback correction amount is guarded with the guard value in the abnormality diagnosis period or in the case where the deterioration degree of the exhaust gas purification rate is calculated by integrating the intake air quantity during the period in which the sub feedback correction amount is guarded with the guard value in the abnormality diagnosis period, according to yet another aspect of the present invention, the exhaust gas purification rate deterioration degree determining section starts integration processing for calculating the deterioration degree of the exhaust gas purification rate after the sub feedback correction amount is guarded with the guard value continuously for a predetermined period in the abnormality diagnosis period.

With such the construction, when the state where the sub feedback correction amount is guarded with the guard value is eliminated within a period shorter than the predetermined period, it is determined that there exists a state where the sub feedback amount is temporarily guarded with the guard value due to the temporary deviation of the downstream air-fuel ratio caused by a noise superimposed on the output of the downstream sensor or a transition (i.e., change in the operation state). Thus, the integration processing for calculating the deterioration degree of the exhaust gas purification rate is prohibited. When the state where the sub feedback correction amount is guarded with the guard value continues for the predetermined period, it is determined that there exists a state where the sub feedback correction amount is guarded with the guard value because of the deviation of the downstream air-fuel ratio caused by the air-fuel ratio variation among the cylinders. Thus, the integration processing for calculating the deterioration degree of the exhaust gas purification rate is started. Accordingly, the deterioration degree of the exhaust gas purification rate can be accurately calculated without being influenced by the noise or the transition.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, several embodiments of the present invention will be described with reference to the drawings.

Figure 1:
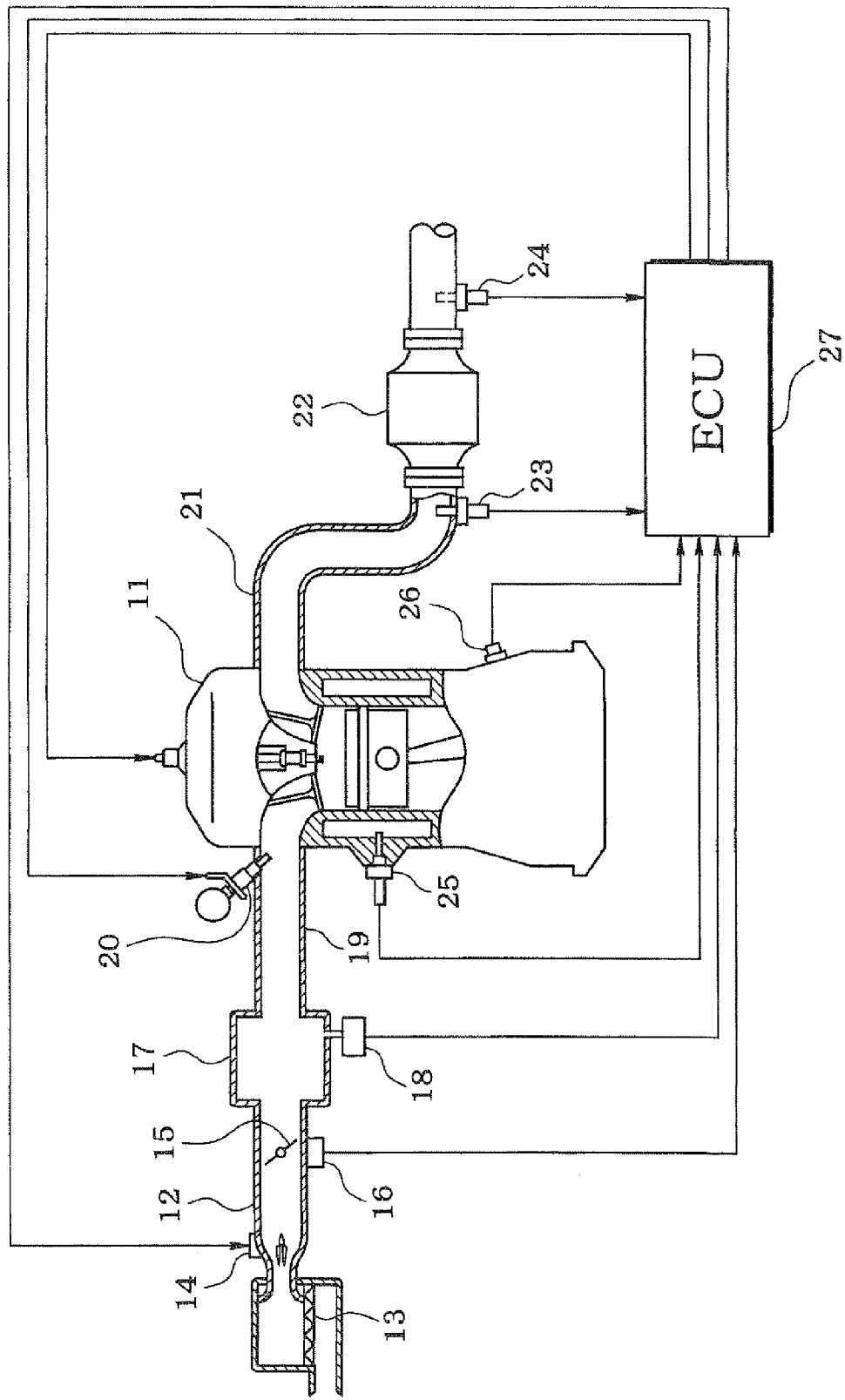
FIG. 1 is a schematic configuration diagram illustrating an engine control system according to a first embodiment of the present invention.
Figure 2:
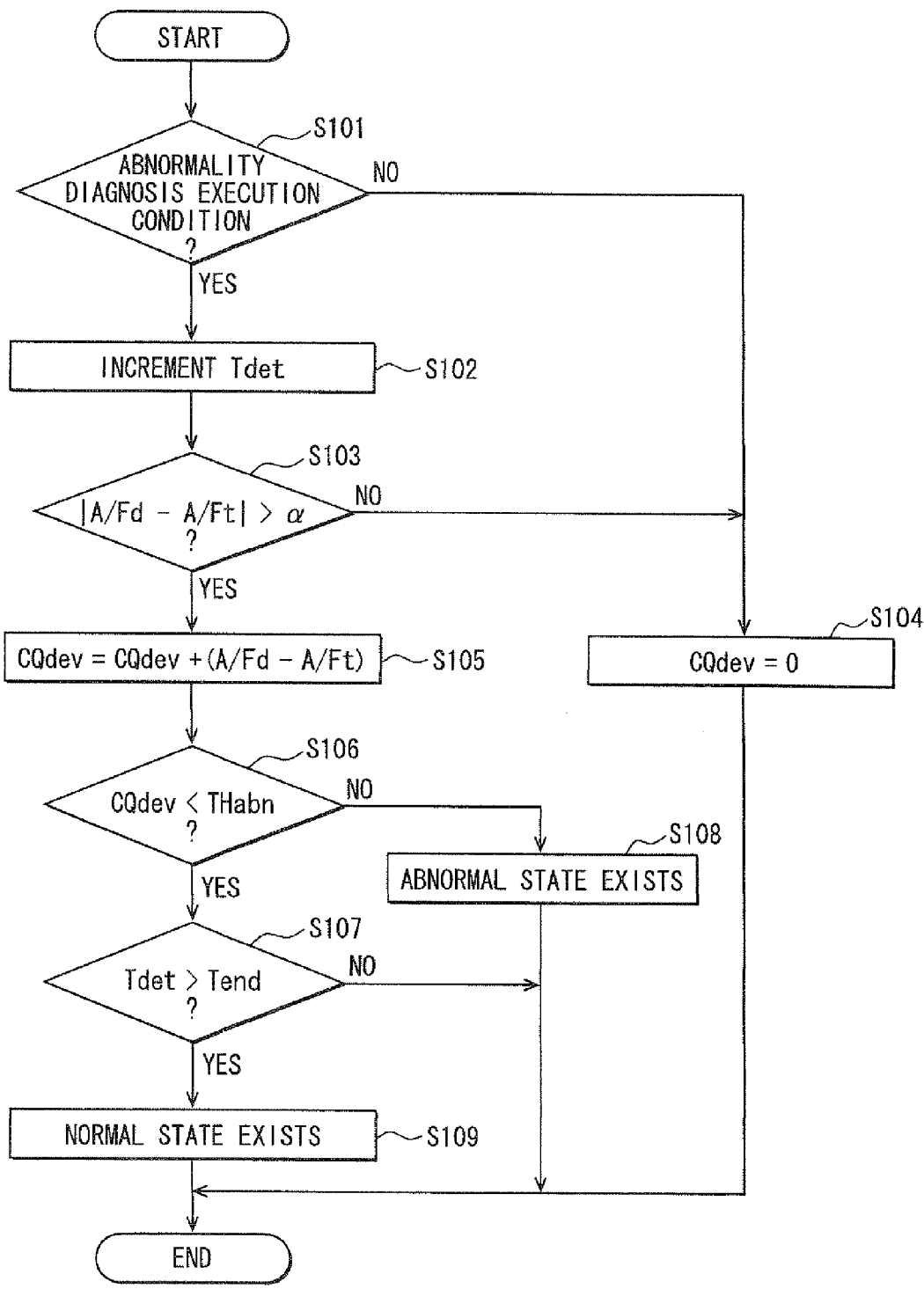
FIG. 2 is a flowchart illustrating a processing flow of an abnormality diagnosis routine according to the first embodiment.

First, a first embodiment of the present invention will be described with reference to FIGS. 1 and 2. A general configuration of an entire engine control system will be explained below with reference to FIG. 1.

An air cleaner 13 is provided in the most upstream portion of an intake pipe 12 of an engine 11 (an internal combustion engine). An airflow meter 14 for sensing an intake air quantity is provided downstream of the air cleaner 13. A throttle valve 15 and a throttle position sensor 16 for sensing an opening degree (a throttle opening degree) of the throttle valve 15 are provided downstream of the airflow meter 14.

A surge tank 17 is provided downstream of the throttle valve 15, and an intake pipe pressure sensor 18 for sensing intake pipe pressure is provided to this surge tank 17. An intake manifold 19 for introducing the air into each cylinder of the engine 11 is provided to the surge tank 17. An injector 20 for injecting fuel is attached near an inlet port of the intake manifold 19 of each cylinder.

A catalysts 22 such as a three-way catalyst for purifying exhaust gas is provided in an exhaust pipe 21 (an exhaust passage) of the engine 11. Sensors 23, 24 for sensing an air-fuel ratio or a rich/lean state of the exhaust gas are provided upstream and downstream of the catalyst 22 respectively. In the present embodiment, both of the upstream sensor 23 and the downstream sensor 24 are air-fuel ratio sensors, each of which outputs a linear air-fuel ratio signal corresponding to the air-fuel ratio of the exhaust gas.

A coolant temperature sensor 25 for sensing coolant temperature and a crank angle sensor 26 for outputting a pulse signal every time a crankshaft of the engine 11 rotates by a predetermined crank angle are attached to a cylinder block of the engine 11. A crank angle and engine rotation speed are sensed based on an output signal of the crank angle sensor 26.

Outputs of the above various sensors are inputted to a control circuit 27 (referred to as an ECU, hereinafter). The ECU 27 is constructed mainly by a microcomputer and executes an air-fuel ratio feedback control program stored in an incorporated ROM (a storage medium) to perform main feedback control (air-fuel ratio feedback control) and sub feedback control. The main feedback control is for performing feedback correction of a supply air-fuel ratio (for example, a fuel injection quantity) to conform the air-fuel ratio of the exhaust gas upstream of the catalyst 22 to an upstream target air-fuel ratio based on an output of the upstream air-fuel ratio sensor 23. The sub feedback control is for performing feedback correction of a control amount related to the main feedback control (for example, the upstream target air-fuel ratio or a main feedback correction amount) to conform the air-fuel ratio of the exhaust gas downstream of the catalyst 22 to a downstream target air-fuel ratio based on an output of the downstream air-fuel ratio sensor 24.

Furthermore, the ECU 27 performs an abnormality diagnosis routine of FIG. 2 incorporated in a storage medium such as the ROM and described in more detail later. Thus, during the execution of the main feedback control and the sub feedback control, the ECU 27 integrates a deviation amount of the downstream air-fuel ratio (i.e., the air-fuel ratio of the exhaust gas downstream of the catalyst 22) sensed with the downstream air-fuel ratio sensor 24 from the downstream target air-fuel ratio during a period in which the downstream air-fuel ratio continuously shows deviations from the downstream target air-fuel ratio. Thus, the ECU 27 calculates a continuous deviation amount of the downstream air-fuel ratio as a deterioration degree of an exhaust gas purification rate. The ECU 27 compares the continuous deviation amount of the downstream air-fuel ratio with an abnormality determination value to determine whether there exists an abnormal state where the exhaust gas purification rate is deteriorated by the variation in the air-fuel ratio among the cylinders (i.e., a state where the control center of the main feedback control has shifted).

In the case of the system having the air-fuel ratio sensor 24 downstream of the catalyst 22, if the control center of the main feedback control shifts due to the air-fuel ratio variation among the cylinders and the exhaust gas purification rate of the catalyst 22 deteriorates, the deviation of the air-fuel ratio of the exhaust gas, which flows out of the catalyst 22, from the target air-fuel ratio increases correspondingly and the deviation amount of the downstream air-fuel ratio increases. Therefore, by using the continuous deviation amount of the downstream air-fuel ratio calculated by integrating the deviation amount of the downstream air-fuel ratio during the period in which the downstream air-fuel ratio continuously shows deviations from the target air-fuel ratio, it can be accurately determined whether there exists the abnormal state where the exhaust gas purification rate is deteriorated by the air-fuel ratio variation among the cylinders (i.e., the state where the control center of the main feedback control has shifted).

Hereafter, processing contents of the abnormality diagnosis routine of FIG. 2 executed by the ECU 27 will be explained. The abnormality diagnosis routine shown in FIG. 2 is executed in a predetermined cycle while power supply to the ECU 27 is ON and functions as an abnormality diagnosing section. If the routine is started, first in S101 (S means "Step"), it is determined whether an abnormality diagnosis execution condition is satisfied. For example, the abnormality diagnosis execution condition includes (1) a condition that the main feedback control and the sub feedback control are in execution, (2) a condition that the catalyst 22 is normal (i.e., the catalyst 22 is not degraded), and (3) a condition that both of the upstream sensor 23 and the downstream sensor 24 are normal (i.e., not degraded). If it is determined in S101 that the abnormality diagnosis execution condition is not satisfied, the process proceeds to S104, in which the continuous deviation amount CQdev of the downstream air-fuel ratio A/Fd is reset to or maintained at 0.

If it is determined in S101 that the abnormality diagnosis execution condition is satisfied, the process proceeds to S102. In S102, a count value of a determination time counter Tdet for determining an abnormality diagnosis period is incremented by a specified time (for example, a time equivalent to a calculation cycle of the routine of FIG. 2). Then, the process proceeds to S103, in which it is determined whether an absolute value of the deviation amount of the downstream air-fuel ratio A/Fd (i.e., the deviation of the downstream air-fuel ratio A/Fd from the target air-fuel ratio A/Ft) has exceeded a predetermined value $\alpha$. If it is determined in S103 that the absolute value of the deviation amount (A/Fd−A/Ft) of the downstream air-fuel ratio A/Fd is equal to or smaller than the predetermined value $\alpha$, it is determined that the downstream air-fuel ratio A/Fd has not substantially deviated from the target air-fuel ratio A/Ft, and the process proceeds to S104. In S104, the continuous deviation amount CQdev of the downstream air-fuel ratio A/Fd is reset to or maintained at 0.

If it is determined in S103 that the absolute value of the deviation amount (A/Fd−A/Ft) of the downstream air-fuel ratio A/Fd has exceeded the predetermined value $\alpha$, it is determined that the downstream air-fuel ratio A/Fd has deviated from the target air-fuel ratio A/Ft, and the process proceeds to S105. In S105, the continuous deviation amount CQdev of the downstream air-fuel ratio A/Fd is updated by integrating the deviation amount (A/Fd−A/Ft) of the present downstream air-fuel ratio A/Fd (i.e., the deviation of the downstream air-fuel ratio A/Fd from the target air-fuel ratio A/Ft) to the previous continuous deviation amount CQdev of the downstream air-fuel ratio A/Fd. Thus, the continuous deviation amount CQdev of the downstream air-fuel ratio A/Fd is calculated by integrating the deviation amount of the downstream air-fuel ratio A/Fd during the period in which the downstream air-fuel ratio A/Fd continuously shows deviations from the target air-fuel ratio A/Ft. The processing of S105 functions as an exhaust gas purification rate deterioration degree determining section.

As the exhaust gas purification rate of the catalyst 22 is deteriorated more by the air-fuel ratio variation among the cylinders, the period in which the downstream air-fuel ratio A/Fd continuously shows deviations from the target air-fuel ratio A/Ft lengthens and the deviation of the downstream air-fuel ratio A/Fd increases. Therefore, the continuous deviation amount CQdev of the downstream air-fuel ratio A/Fd calculated by integrating the deviation amount (A/Fd−A/Ft) of the downstream air-fuel ratio A/Fd during the period of the continuous deviation serves as a parameter accurately reflecting the deterioration degree of the actual exhaust gas purification rate.

Then, the process proceeds to S106, in which it is determined whether the continuous deviation amount CQdev of the downstream air-fuel ratio A/Fd is smaller than an abnormality determination value THabn. If it is determined that the continuous deviation amount CQdev of the downstream air-fuel ratio A/Fd is smaller than the abnormality determination value THabn, the process proceeds to S107, in which it is determined whether the count value of the determination time counter Tdet has exceeded an end determination value Tend.

If it is determined in S107 that the count value of the determination time counter Tdet has not exceeded the end determination value Tend, the process returns to S101. Then, the processing for calculating the continuous deviation amount CQdev of the downstream air-fuel ratio A/Fd by integrating the deviation amount of the downstream air-fuel ratio A/Fd during the period in which the downstream air-fuel ratio A/Fd continuously shows deviations from the target air-fuel ratio A/Ft is repeated.

Thereafter, when it is determined in S106 that the continuous deviation amount CQdev of the downstream air-fuel ratio A/Fd is equal to or greater than the abnormality determination value THabn, the process proceeds to S108, in which it is determined that there exists an abnormal state where the exhaust gas purification rate is deteriorated by the air-fuel ratio variation among the cylinders (i.e., the state where the control center of the main feedback control has shifted).

If it is determined in S107 that the count value of the determination time counter Tdet has exceeded the end determination value Tend while it is not determined in S106 that the continuous deviation amount CQdev of the downstream air-fuel ratio A/Fd is equal to or greater than the abnormality determination value THabn, it is determined that the abnormality diagnosis period has expired and the process proceeds to S109. In S109, it is determined that there exists a normal state (i.e., that there exists no abnormal state where the exhaust gas purification rate is deteriorated by the air-fuel ratio variation among the cylinders).

According to the above-described first embodiment, the continuous deviation amount CQdev of the downstream air-fuel ratio A/Fd is calculated by integrating the deviation amount of the downstream air-fuel ratio A/Fd during the period in which the downstream air-fuel ratio A/Fd continuously shows deviations from the target air-fuel ratio A/Ft. The continuous deviation amount CQdev of the downstream air-fuel ratio A/Fd is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders. As a result, the abnormal state where the exhaust gas purification rate is deteriorated by the air-fuel ratio variation among the cylinders can be detected in an early stage.

Next, a second embodiment of the present invention will be described with reference to FIG. 3, focusing on differences from the first embodiment.

In the second embodiment, an abnormality diagnosis routine of FIG. 3 mentioned in detail later is performed. Thus, the deviation amount of the downstream air-fuel ratio A/Fd (i.e., the deviation of the downstream air-fuel ratio A/Fd from the target air-fuel ratio A/Ft) is integrated in a predetermined abnormality diagnosis period. Thus, an integrated deviation amount IQdev of the downstream air-fuel ratio A/Fd is calculated (as the deterioration degree of the exhaust gas purification rate). The integrated deviation amount IQdev of the downstream air-fuel ratio A/Fd is compared with an abnormality determination value THabn to determine whether there exists the abnormal state where the exhaust gas purification rate is deteriorated by the air-fuel ratio variation among the cylinders (i.e., the state where the control center of the main feedback control has shifted).

Figure 3:
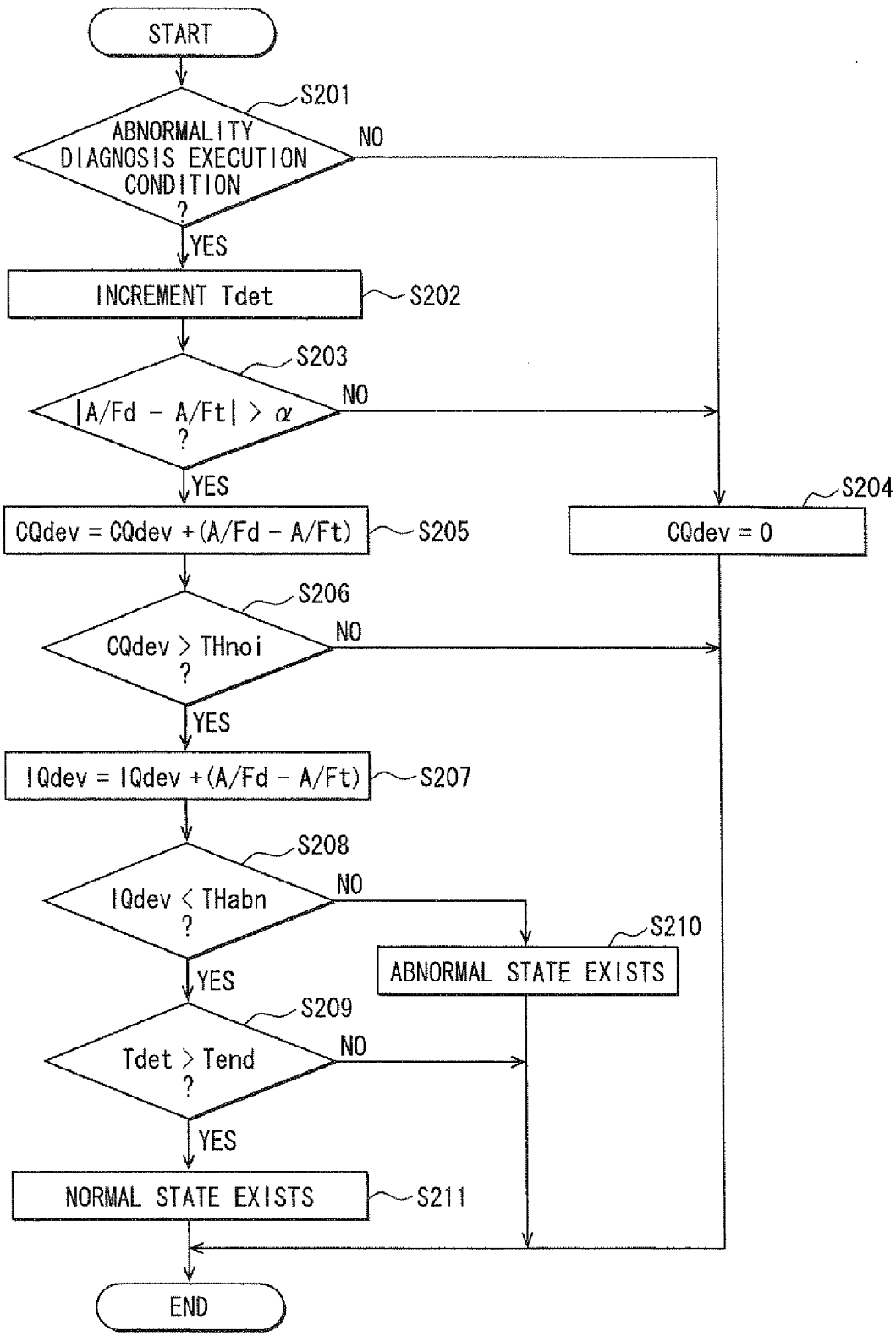
FIG. 3 is a flowchart illustrating a processing flow of an abnormality diagnosis routine according to a second embodiment of the present invention.

In the abnormality diagnosis routine of FIG. 3, first in S201, it is determined whether the abnormality diagnosis execution condition is satisfied. If it is determined in S201 that the abnormality diagnosis execution condition is not satisfied, the process proceeds to S204, in which the continuous deviation amount CQdev of the downstream air-fuel ratio A/Fd is reset to or maintained at 0.

If it is determined in S201 that the abnormality diagnosis execution condition is satisfied, the process proceeds to S202. In S202, the count value of the determination time counter Tdet for determining the abnormality diagnosis period is incremented by the specified time. Then, the process proceeds to S203, in which it is determined whether the absolute value of the deviation amount of the downstream air-fuel ratio A/Fd (i.e., the deviation of the downstream air-fuel ratio A/Fd from the target air-fuel ratio A/Ft) has exceeded the predetermined value a. If it is determined in S203 that the absolute value of the deviation amount (A/Fd−A/Ft) of the downstream air-fuel ratio A/Fd is equal to or smaller the predetermined value α, it is determined that the downstream air-fuel ratio A/Fd has not substantially deviated from the target air-fuel ratio A/Ft, and the process proceeds to S204. In S204, the continuous deviation amount CQdev of the downstream air-fuel ratio A/Fd is reset to or maintained at 0.

When it is determined in S203 that the absolute value of the deviation amount (A/Fd−A/Ft) of the downstream air-fuel ratio A/Fd has exceeded the predetermined value α, it is determined that the downstream air-fuel ratio A/Fd has deviated from the target air-fuel ratio A/Ft, and the process proceeds to S205. In S205, the continuous deviation amount CQdev of the downstream air-fuel ratio A/Fd is updated by integrating the deviation amount (A/Fd−A/Ft) of the present downstream air-fuel ratio A/Fd (i.e., the deviation of the downstream air-fuel ratio A/Fd from the target air-fuel ratio A/Ft) to the previous continuous deviation amount CQdev of the downstream air-fuel ratio A/Fd.

Then, the process proceeds to S206, in which it is determined whether the continuous deviation amount CQdev of the downstream air-fuel ratio A/Fd has exceeded a noise determination value THnoi. Thus, it is determined whether the state, in which the downstream air-fuel ratio A/Fd shows deviations from the target air-fuel ratio A/Ft, has continued for a predetermined period (i.e., a period in which the continuous deviation amount CQdev of the downstream air-fuel ratio A/Fd exceeds the noise determination value THnoi).

When it is determined in S206 that the continuous deviation amount CQdev of the downstream air-fuel ratio A/Fd is equal to or smaller than the noise determination value THnoi, that is, when the duration of the state where the downstream air-fuel ratio A/Fd shows deviations from the target air-fuel ratio A/Ft is shorter than the predetermined period, it is determined that the deviation of the downstream air-fuel ratio A/Fd is a temporary deviation due to a noise superimposed on the output of the downstream air-fuel ratio sensor 24 or a transition (i.e., change in the operation state). Then, the routine is ended without performing the processing from S207. Thus, the integration processing for calculating the integrated deviation amount IQdev of the downstream air-fuel ratio A/Fd is prohibited.

When it is determined in S206 that the continuous deviation amount CQdev of the downstream air-fuel ratio A/Fd has exceeded the noise determination value THnoi, that is, when the downstream air-fuel ratio A/Fd shows deviations from the target air-fuel ratio A/Ft continuously for the predetermined period, it is determined that the deviation of the downstream air-fuel ratio A/Fd is caused by the air-fuel ratio variation among the cylinders, and the process proceeds to S207. In S207, the integrated deviation amount IQdev of the downstream air-fuel ratio A/Fd is updated by integrating the deviation amount (A/Fd−A/Ft) of the present downstream air-fuel ratio A/Fd (i.e., the deviation of the downstream air-fuel ratio A/Fd from the target air-fuel ratio A/Ft) to the previous integrated deviation amount IQdev of the downstream air-fuel ratio A/Fd. Thus, the integration processing for calculating the integrated deviation amount IQdev of the downstream air-fuel ratio A/Fd is started after the downstream air-fuel ratio A/Fd shows deviations from the target air-fuel ratio A/Ft continuously for the predetermined period in the abnormality diagnosis period.

As the exhaust gas purification rate of the catalyst 22 is deteriorated more by the variation in the air-fuel ratio among the cylinders, the frequency of occurrence of the state where the downstream air-fuel ratio A/Fd deviates from the target air-fuel ratio A/Ft in the abnormality diagnosis period increases and the deviation amount of the downstream air-fuel ratio A/Fd increases. Therefore, the integrated deviation amount IQdev of the downstream air-fuel ratio A/Fd calculated by integrating the deviation amount of the downstream air-fuel ratio A/Fd in the abnormality diagnosis period serves as the parameter accurately reflecting the deterioration degree of the actual exhaust gas purification rate.

Then, the process proceeds to S208, in which it is determined whether the integrated deviation amount IQdev of the downstream air-fuel ratio A/Fd is smaller than the abnormality determination value THabn. If it is determined that the integrated deviation amount IQdev of the downstream air-fuel ratio A/Fd is smaller than the abnormality determination value THabn, the process proceeds to S209, in which it is determined whether the count value of the determination time counter Tdet has exceeded the end determination value Tend.

When it is determined in S209 that the count value of the determination time counter Tdet has not exceeded the end determination value Tend, the process returns to S201. Thus, the processing for obtaining the integrated deviation amount IQdev of the downstream air-fuel ratio A/Fd by integrating the deviation amount of the downstream air-fuel ratio A/Fd in the abnormality diagnosis period is repeated.

Then, when it is determined in S208 that the integrated deviation amount IQdev of the downstream air-fuel ratio A/Fd is equal to or greater than the abnormality determination value THabn, the process proceeds to S210. In S210, it is determined that there exists the abnormal state where the exhaust gas purification rate is deteriorated by the air-fuel ratio variation among the cylinders (i.e., the state where the control center of the main feedback control has shifted).

When it is determined in S209 that the count value of the determination time counter Tdet has exceeded the end determination value Tend while it is not determined in S208 that the integrated deviation amount IQdev of the downstream air-fuel ratio A/Fd is equal to or greater than the abnormality determination value THabn, it is determined that the abnormality diagnosis period has expired, and the process proceeds to S211, in which it is determined that there exists the normal state (i.e., that there exists no abnormal state where the exhaust gas purification rate is deteriorated by the air-fuel ratio variation among the cylinders).

According to the above-described second embodiment, the integrated deviation amount IQdev of the downstream air-fuel ratio A/Fd is calculated by integrating the deviation amount of the downstream air-fuel ratio A/Fd in the abnormality diagnosis period. The integrated deviation amount IQdev of the downstream air-fuel ratio A/Fd is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders. As a result, the abnormal state where the exhaust gas purification rate is deteriorated by the air-fuel ratio variation among the cylinders can be detected in an early stage, According to the second embodiment, when it is determined that the continuous deviation amount CQdev of the downstream air-fuel ratio A/Fd is equal to or smaller than the noise determination value THnoi, that is, when the state where the downstream air-fuel ratio A/Fd has deviated from the target air-fuel ratio A/Ft is eliminated within a period shorter than the predetermined period, it is determined that the deviation of the downstream air-fuel ratio A/Fd is a temporary deviation due to a noise superimposed on the output of the downstream air-fuel ratio sensor 24 or a transition (i.e., change in the operation state). Thus, the integration processing for calculating the integrated deviation amount IQdev of the downstream air-fuel ratio A/Fd is prohibited. When it is determined that the continuous deviation amount CQdev of the downstream air-fuel ratio A/Fd has exceeded the noise determination value THnoi, that is, when the downstream air-fuel ratio A/Fd shows deviations from the target air-fuel ratio A/Ft continuously for the predetermined period, it is determined that the deviation of the downstream air-fuel ratio A/Fd is caused by the air-fuel ratio variation among the cylinders, and the integration processing for calculating the integrated deviation amount IQdev of the downstream air-fuel ratio A/Fd is started. Accordingly, the integrated deviation amount IQdev of the downstream air-fuel ratio A/Fd can be accurately calculated without being influenced by the noise or the transition.

Next, a third embodiment of the present invention will be described with reference to FIG. 4, focusing on differences from the first embodiment.

In the third embodiment, an abnormality diagnosis routine of FIG. 4 mentioned in detail later is performed. Thus, a product of the deviation amount (A/Fd−A/Ft) of the downstream air-fuel ratio A/Fd and the intake air quantity Qair is integrated during the period in which the downstream air-fuel ratio A/Fd continuously shows deviations from the target air-fuel ratio A/Ft. Thus, a continuous emission discharge quantity CQemi is calculated (as the deterioration degree of the exhaust gas purification rate). The continuous emission discharge quantity CQemi is compared with an abnormality determination value THabn to determine whether there exists the abnormal state where the exhaust gas purification rate is deteriorated by the air-fuel ratio variation among the cylinders (i.e., the state where the control center of the main feedback control has shifted).

Figure 4:
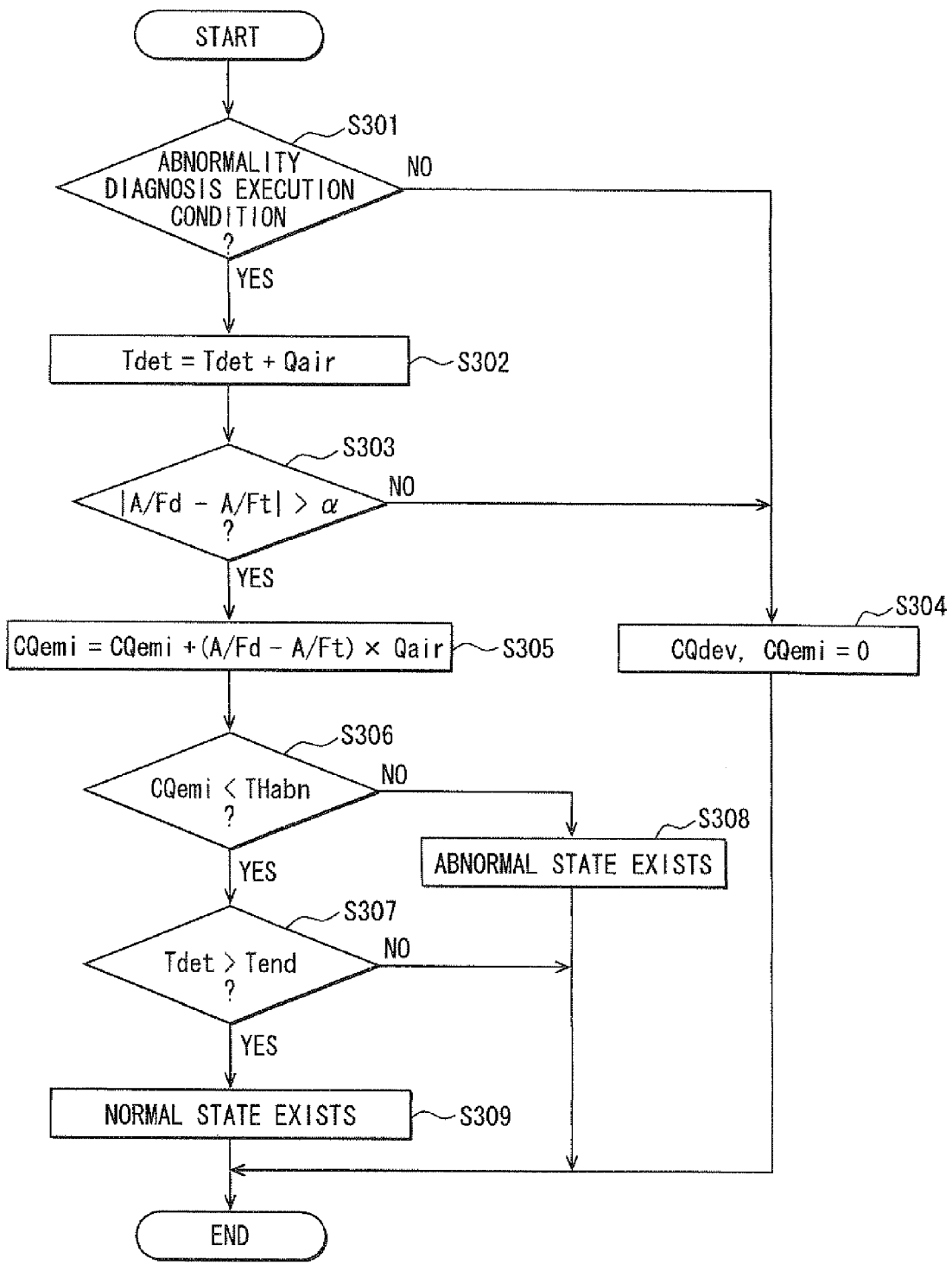
FIG. 4 is a flowchart illustrating a processing flow of an abnormality diagnosis routine according to a third embodiment of the present invention.

In the abnormality diagnosis routine of FIG. 4, first in S301, it is determined whether the abnormality diagnosis execution condition is satisfied. If it is determined in S301 that the abnormality diagnosis execution condition is not satisfied, the process proceeds to S304, in which the continuous deviation amount CQdev of the downstream air-fuel ratio A/Fd is reset to or maintained at o and also the continuous emission discharge quantity CQemi is reset to or maintained at 0.

If it is determined in S301 that the abnormality diagnosis execution condition is satisfied, the process proceeds to S302. In S302, the count value of the determination time counter Tdet for determining the abnormality diagnosis period is incremented by a present intake air quantity Qair. Then, the process proceeds to S303, in which it is determined whether the absolute value of the deviation amount of the downstream air-fuel ratio A/Fd (i.e., the deviation of the downstream air-fuel ratio A/Fd from the target air-fuel ratio A/Ft) has exceeded the predetermined value α. If it is determined in S303 that the absolute value of the deviation amount (A/Fd−A/Ft) of the downstream air-fuel ratio A/Fd is equal to or smaller the predetermined value α, it is determined that the downstream air-fuel ratio A/Fd has not substantially deviated from the target air-fuel ratio A/Ft, and the process proceeds to S304. In S304, the continuous deviation amount CQdev of the downstream air-fuel ratio A/Fd is reset to or maintained at 0 and also the continuous emission discharge quantity CQemi is reset to or maintained at 0.

When it is determined in S303 that the absolute value of the deviation amount (A/Fd−A/Ft) of the downstream air-fuel ratio A/Fd has exceeded the predetermined value α, it is determined that the downstream air-fuel ratio A/Fd has deviated from the target air-fuel ratio A/Ft, and the process proceeds to S305. In S305, the continuous emission discharge quantity CQemi is updated by integrating the product of the deviation amount (A/Fd−A/Ft) of the present downstream air-fuel ratio A/Fd and the intake air quantity Qair to the previous continuous emission discharge quantity CQemi. Thus, the continuous emission discharge quantity CQemi is calculated by integrating the product of the deviation amount (A/Fd−A/Ft) of the downstream air-fuel ratio A/Fd and the intake air quantity Qair during the period in which the downstream air-fuel ratio A/Fd continuously shows deviations from the target air-fuel ratio A/Ft.

The emission discharge quantity changes in accordance with the deviation amount of the downstream air-fuel ratio A/Fd and the intake air quantity Qair (i.e., an exhaust gas quantity). Therefore, the continuous emission discharge quantity CQemi calculated by integrating the product of the deviation amount (A/Fd−A/Ft) of the downstream air-fuel ratio A/Fd and the intake air quantity Qair during the period in which the downstream air-fuel ratio A/Fd continuously shows deviations from the target air-fuel ratio A/Ft serves as the parameter accurately reflecting the actual emission discharge quantity.

Then, the process proceeds to S306, in which it is determined whether the continuous emission discharge quantity CQemi is smaller than the abnormality determination value THabn. If it is determined that the continuous emission discharge quantity CQemi is smaller than the abnormality determination value THabn, the process proceeds to S307, in which it is determined whether the count value of the determination time counter Tdet has exceeded the end determination value Tend.

If it is determined in S307 that the count value of the determination time counter Tdet has not exceeded the end determination value Tend, the process returns to S301. Thus, the processing for calculating the continuous emission discharge quantity CQemi by integrating the product of the deviation amount (A/Fd−A/Ft) of the downstream air-fuel ratio A/Fd and the intake air quantity during the period in which the downstream air-fuel ratio A/Fd continuously shows deviations from the target air-fuel ratio A/Ft is repeated.

Thereafter, when it is determined in S306 that the continuous emission discharge quantity CQemi is equal to or greater than the abnormality determination value THabn, the process proceeds to S308. In S308, it is determined that there exists the abnormal state where the exhaust gas purification rate is deteriorated by the air-fuel ratio variation among the cylinders (i.e., the state where the control center of the main feedback control has shifted).

If it is determined in S307 that the count value of the determination time counter Tdet has exceeded the end determination value Tend while it is not determined in S306 that the continuous emission discharge quantity CQemi is equal to or greater than the abnormality determination value THabn, it is determined that the abnormality diagnosis period has expired, and the process proceeds to S309, in which it is determined that there exists the normal state (i.e., that there exists no abnormal state where the exhaust gas purification rate is deteriorated by the air-fuel ratio variation among the cylinders).

According to the above-described third embodiment, the continuous emission discharge quantity CQemi is calculated by integrating the product of the deviation amount (A/Fd−A/Ft) of the downstream air-fuel ratio A/Fd and the intake air quantity Qair during the period in which the downstream air-fuel ratio A/Fd continuously shows deviations from the target air-fuel ratio A/Ft. The continuous emission discharge quantity CQemi is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders and the emission discharge quantity has actually increased. As a result, the abnormal state where the exhaust gas purification rate is deteriorated by the air-fuel ratio variation among the cylinders can be detected in an early stage.

Next, a fourth embodiment of the present invention will be described with reference to FIG. 5, focusing on differences from the first embodiment.

In the fourth embodiment, an abnormality diagnosis routine of FIG. 5 mentioned in detail later is performed. Thus, the product of the deviation amount (A/Fd−A/Ft) of the downstream air-fuel ratio A/Fd and the intake air quantity Qair is integrated in a predetermined abnormality diagnosis period. Thus, an integrated emission discharge quantity IQemi is calculated (as the deterioration degree of the exhaust gas purification rate). The integrated emission discharge quantity IQemi is compared with an abnormality determination value THabn to determine whether there exists the abnormal state where the exhaust gas purification rate is deteriorated by the air-fuel ratio variation among the cylinders (i.e., the state where the control center of the main feedback control has shifted).

Figure 5:
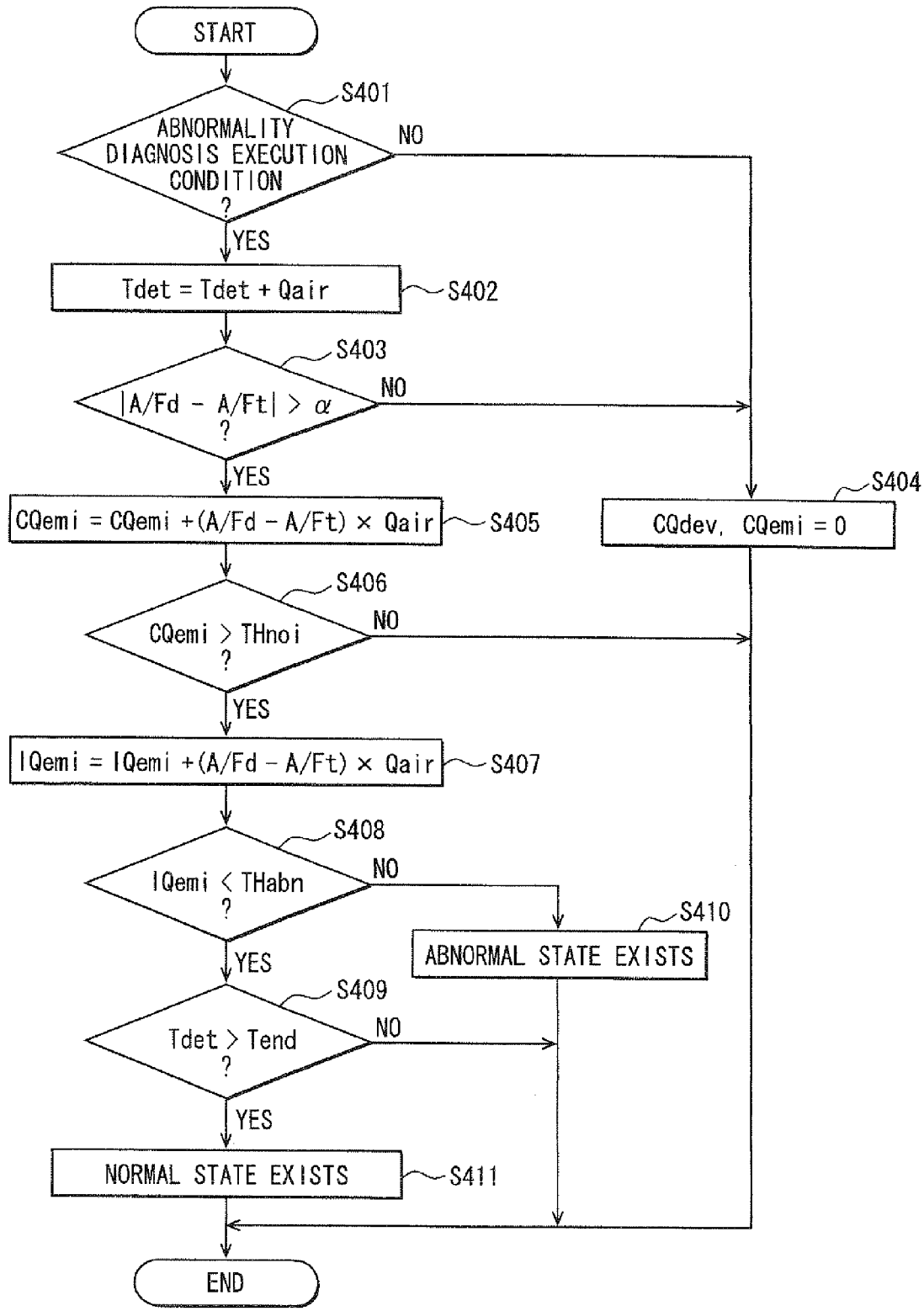
FIG. 5 is a flowchart illustrating a processing flow of an abnormality diagnosis routine according to a fourth embodiment of the present invention.

In the abnormality diagnosis routine of FIG. 5, first in S401, it is determined whether the abnormality diagnosis execution condition is satisfied. If it is determined in S401 that the abnormality diagnosis execution condition is not satisfied, the process proceeds to S404, in which the continuous deviation amount CQdev of the downstream air-fuel ratio A/Fd is reset to or maintained at 0 and also the continuous emission discharge quantity CQemi is reset to or maintained at 0.

If it is determined in S401 that the abnormality diagnosis execution condition is satisfied, the process proceeds to S402. In S402, the count value of the determination time counter Tdet for determining the abnormality diagnosis period is incremented by the present intake air quantity Qair. Then, the process proceeds to S403, in which it is determined whether the absolute value of the deviation amount of the downstream air-fuel ratio A/Fd (i.e., the deviation of the downstream air-fuel ratio A/Fd from the target air-fuel ratio A/Ft) has exceeded the predetermined value α. If it is determined in S403 that the absolute value of the deviation amount (A/Fd−A/Ft) of the downstream air-fuel ratio A/Fd is equal to or smaller than the predetermined value α, it is determined that the downstream air-fuel ratio A/Fd has not substantially deviated from the target air-fuel ratio A/Ft, and the process proceeds to S404. In S404, the continuous deviation amount CQdev of the downstream air-fuel ratio A/Fd is reset to or maintained at 0 and also the continuous emission discharge quantity CQemi is reset to or maintained at 0.

When it is determined in S403 that the absolute value of the deviation amount (A/Fd−A/Ft) of the downstream air-fuel ratio A/Fd has exceeded the predetermined value α, it is determined that the downstream air-fuel ratio A/Fd has deviated from the target air-fuel ratio A/Ft, and the process proceeds to S405. In S405, the continuous emission discharge quantity CQemi is updated by integrating the product of the deviation amount (A/Fd−A/Ft) of the present downstream air-fuel ratio A/Fd and the intake air quantity Qair to the previous continuous emission discharge quantity CQemi.

Then, the process proceeds to S406, in which it is determined whether the continuous emission discharge quantity CQemi has exceeded a noise determination value THnoi. Thus, it is determined whether the downstream air-fuel ratio A/Fd shows deviations from the target air-fuel ratio A/Ft continuously for a predetermined period (i.e., a period in which the continuous emission discharge quantity CQemi exceeds the noise determination value THnoi).

When it is determined in S406 that the continuous emission discharge quantity CQemi is equal to or smaller than the noise determination value THnoi, that is, when the duration of the state where the downstream air-fuel ratio A/Fd has deviated from the target air-fuel ratio A/Ft is shorter than the predetermined period, it is determined that the deviation of the downstream air-fuel ratio A/Fd is a temporary deviation due to a noise superimposed on the output of the downstream air-fuel ratio sensor 24 or a transition (i.e., change in the operation state). Then, the routine is ended without performing the processing from S407. Thus, the integration processing for calculating the integrated emission discharge quantity IQemi is prohibited.

When it is determined in S406 that the continuous emission discharge quantity CQemi has exceeded the noise determination value THnoi, that is, when the downstream air-fuel ratio A/Fd shows deviations from the target air-fuel ratio A/Ft continuously for the predetermined period, it is determined that the deviation of the downstream air-fuel ratio A/Fd is caused by the air-fuel ratio variation among the cylinders, and the process proceeds to S407. In S407, the integrated emission discharge quantity IQemi is updated by integrating the product of the deviation amount (A/Fd−A/Ft) of the present downstream air-fuel ratio A/Fd and the intake air quantity Qair to the previous integrated emission discharge quantity IQemi. Thus, the integration processing for calculating the integrated emission discharge quantity IQemi is started after the downstream air-fuel ratio A/Fd shows deviations from the target air-fuel ratio A/Ft continuously for the predetermined period in the abnormality diagnosis period.

The emission discharge quantity changes in accordance with the deviation amount of the downstream air-fuel ratio A/Fd and the intake air quantity Qair (i.e., the exhaust gas quantity). Therefore, the integrated emission discharge quantity IQemi calculated by integrating the product of the deviation amount (A/Fd−A/Ft) of the downstream air-fuel ratio A/Fd and the intake air quantity Qair in the abnormality diagnosis period serves as the parameter accurately reflecting the actual emission discharge quantity.

Then, the process proceeds to S408, in which it is determined whether the integrated emission discharge quantity IQemi is smaller than the abnormality determination value THabn. If it is determined that the integrated emission discharge quantity IQemi is smaller than the abnormality determination value THabn, the process proceeds to S409, in which it is determined whether the count value of the determination time counter Tdet has exceeded the end determination value Tend.

If it is determined in S409 that the count value of the determination time counter Tdet has not exceeded the end determination value Tend, the process returns to S401. Thus, the processing for calculating the integrated emission discharge quantity IQemi by integrating the product of the deviation amount of the downstream air-fuel ratio A/Fd and the intake air quantity Qair in the abnormality diagnosis period is repeated.

Thereafter, when it is determined in S408 that the integrated emission discharge quantity IQemi is equal to or greater than the abnormality determination value THabn, the process proceeds to S410. In S410, it is determined that there exists the abnormal state where the exhaust gas purification rate is deteriorated by the air-fuel ratio variation among the cylinders (i.e., the state where the control center of the main feedback control has shifted).

If it is determined in S409 that the count value of the determination time counter Tdet has exceeded the end determination value Tend white it is not determined in S408 that the integrated emission discharge quantity IQemi is equal to or greater than the abnormality determination value THabn, it is determined that the abnormality diagnosis period has expired, and the process proceeds to S411, in which it is determined that there exists the normal state (i.e., that there exists no abnormal state where the exhaust gas purification rate is deteriorated by the air-fuel ratio variation among the cylinders).

According to the above-described fourth embodiment, the integrated emission discharge quantity IQemi is calculated by integrating the product of the deviation amount of the downstream air-fuel ratio A/Fd and the intake air quantity Qair in the abnormality diagnosis period. The integrated emission discharge quantity IQemi is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders and the emission discharge quantity has actually increased. As a result, the abnormal state where the exhaust gas purification rate is deteriorated by the air-fuel ratio variation among the cylinders can be detected in an early stage.

According to the fourth embodiment, when it is determined that the continuous emission discharge quantity CQemi is equal to or smaller than the noise determination value THnoi (i.e., when the duration of the state where the downstream air-fuel ratio A/Fd shows deviations from the target air-fuel ratio A/Ft is shorter than the predetermined period), it is determined that the deviation of the downstream air-fuel ratio A/Fd is a temporary deviation due to a noise superimposed on the output of the downstream air-fuel ratio sensor 24 or a transition (i.e., change in the operation state). Thus, the integration processing for calculating the integrated emission discharge quantity IQemi is prohibited, When it is determined that the continuous emission discharge quantity CQemi has exceeded the noise determination value THnoi, that is, when the downstream air-fuel ratio A/Fd shows deviations from the target air-fuel ratio A/Ft continuously for the predetermined period, it is determined that the deviation of the downstream air-fuel ratio A/Fd is caused by the air-fuel ratio variation among the cylinders, and the integration processing for calculating the integrated emission discharge quantity IQemi is started. Accordingly, the integrated emission discharge quantity IQemi can be accurately calculated without being influenced by the noise or the transition.

Next, a fifth embodiment of the present invention will be described with reference to FIG. 6, focusing on differences from the first embodiment.

Each of the above-described first to fourth embodiments employs the system configuration arranging the downstream air-fuel ratio sensor 24 downstream of the catalyst 22 for sensing the air-fuel ratio of the exhaust gas. The fifth embodiment employs a system configuration of arranging a downstream oxygen sensor 24 downstream of the catalyst 22 for sensing a rich/lean state of the exhaust gas. Output voltage of the downstream oxygen sensor 24 inverts according to whether the air-fuel ratio of the exhaust gas is richer or leaner than the theoretical air-fuel ratio.

In the fifth embodiment, an abnormality diagnosis routine of FIG. 6 mentioned in detail later is performed. Thus, a time in which a correction amount (referred to as a sub feedback correction amount, hereinafter) used in the sub feedback control to perform the feedback correction of the control amount of the main feedback control (such as the upstream target air-fuel ratio or the main feedback correction amount) is continuously guarded with a predetermined guard value is calculated as a continuous guard time CTgua (as the deterioration degree of the exhaust gas purification rate). The continuous guard time CTgua is compared with an abnormality determination value THabn to determine whether there exists the abnormal state where the exhaust gas purification rate is deteriorated by the air-fuel ratio variation among the cylinders (i.e., the state where the control center of the main feedback control has shifted).

In the case of the system arranging the oxygen sensor 24 downstream of the catalyst 22, it is difficult to accurately calculate the deviation amount of the downstream air-fuel ratio A/Fd. In this regard, if the exhaust gas purification rate of the catalyst 22 deteriorates because the control center of the main feedback control is shifted by the air-fuel ratio variation among the cylinders, the deviation of the air-fuel ratio of the exhaust gas flowing out of the catalyst 22 from the target air-fuel ratio A/Ft increases correspondingly, so the sub feedback correction amount increases and will be guarded with the guard value. Therefore, by using the continuous guard time CTgua, which is the time in which the sub feedback correction amount is continuously guarded by the guard value, it can be accurately determined whether there exists the abnormal state where the exhaust gas purification rate is deteriorated by the air-fuel ratio variation among the cylinders (i.e., the state where the control center of the main feedback control has shifted).

Figure 6:
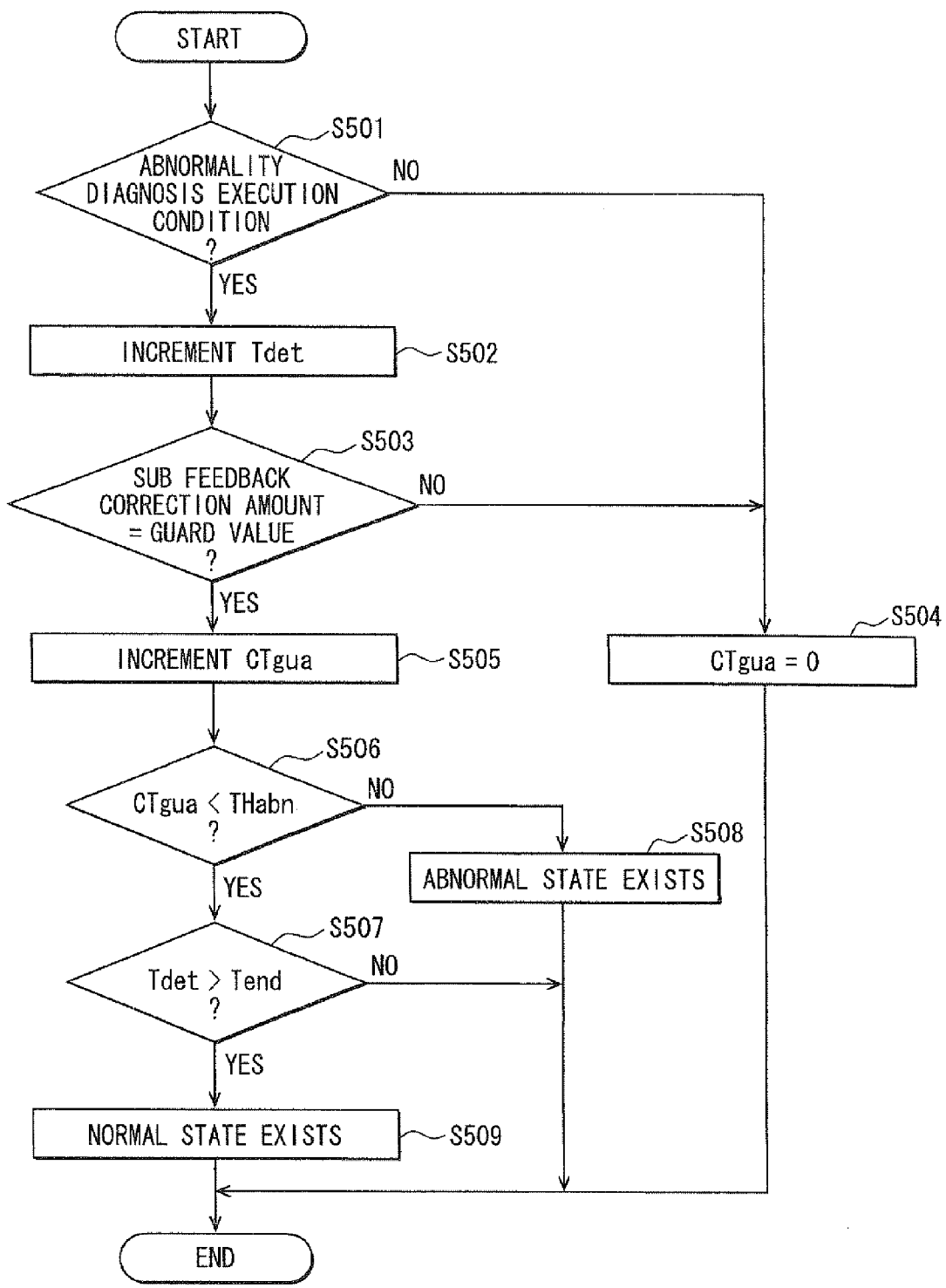
FIG. 6 is a flowchart illustrating a processing flow of an abnormality diagnosis routine according to a fifth embodiment of the present invention.

In the abnormality diagnosis routine of FIG. 6, first in S501, it is determined whether the abnormality diagnosis execution condition is satisfied. If it is determined in S501 that the abnormality diagnosis execution condition is not satisfied, the process proceeds to S504, in which the continuous guard time CTgua is reset to or maintained at 0.

If it is determined in S501 that the abnormality diagnosis execution condition is satisfied, the process proceeds to S502. In S502, the count value of the determination time counter Tdet for determining the abnormality diagnosis period is incremented by a specified time. Then, the process proceeds to S503, in which it is determined whether the sub feedback correction amount is guarded with the guard value (i.e., whether the sub feedback correction amount=the guard value). If it is determined in S503 that the sub feedback correction amount is not guarded with the guard value, the process proceeds to S504, in which the continuous guard time CTgua is reset to or maintained at 0.

If it is determined in S503 that the sub feedback correction amount is guarded with the guard value, the process proceeds to S505. In S505, the continuous guard time CTgua is incremented by a specified time (for example, a time equivalent to a calculation cycle of the routine of FIG. 6). Thus, the continuous guard time CTguas as the time in which the sub feedback correction amount is continuously guarded with the guard value is measured.

As the exhaust gas purification rate of the catalyst 22 deteriorates more due to the air-fuel ratio variation among the cylinders, the time in which the sub feedback correction amount is continuously guarded with the guard value lengthens. Therefore, the continuous guard time CTgua calculated by measuring the duration of the continuously guarded state of the sub feedback correction amount serves as a parameter accurately reflecting the deterioration degree of the actual exhaust gas purification rate.

Then, the process proceeds to S506, in which it is determined whether the continuous guard time CTgua is smaller than the abnormality determination value THabn. If it is determined that the continuous guard time CTgua is smaller than the abnormality determination value THabn, the process proceeds to S507, in which it is determined whether the count value of the determination time counter Tdet has exceeded the end determination value Tend.

When it is determined in S507 that the count value of the determination time counter Tdet has not exceeded the end determination value Tend, the process returns to S501. Thus, the processing for measuring the continuous guard time CTgua as the time in which the sub feedback correction amount is continuously guarded with the guard value is repeated.

Thereafter, when it is determined in S506 that the continuous guard time CTgua is equal to or greater than the abnormality determination value THabn, the process proceeds to S508. In S508, it is determined that there exists the abnormal state where the exhaust gas purification rate is deteriorated by the air-fuel ratio variation among the cylinders (i.e., the state where the control center of the main feedback control has shifted).

If it is determined in S507 that the count value of the determination time counter Tdet has exceeded the end determination value Tend while it is not determined in S506 that the continuous guard time CTgua is equal to or greater than the abnormality determination value THabn, it is determined that the abnormality diagnosis period has expired, and the process proceeds to S509, in which it is determined that there exists the normal state (i.e., that there exists no abnormal state where the exhaust gas purification rate is deteriorated by the air-fuel ratio variation among the cylinders).

According to the above-described fifth embodiment, the time in which the sub feedback correction amount is continuously guarded with the guard value is obtained as the continuous guard time CTgua. The continuous guard time CTgua is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders. As a result, the abnormal state where the exhaust gas purification rate is deteriorated by the air-fuel ratio variation among the cylinders can be detected in an early stage.

Moreover, the oxygen sensor cheaper than the air-fuel ratio sensor can be used as the downstream sensor 24, exerting an advantage of cost reduction.

Next, a sixth embodiment of the present invention will be described with reference to FIG. 7, focusing on differences from the fifth embodiment.

In the sixth embodiment, an abnormality diagnosis routine of FIG. 7 mentioned in detail later is performed. Thus, a time in which the sub feedback correction amount is guarded with the guard value in a predetermined abnormality diagnosis period is integrated to calculate an integrated guard time ITgua (as the deterioration degree of the exhaust gas purification rate). The integrated guard time ITgua is compared with the abnormality determination value THabn to determine whether there exists the abnormal state where the exhaust gas purification rate is deteriorated by the air-fuel ratio variation among the cylinders (i.e., the state where the control center of the main feedback control has shifted).

Figure 7:
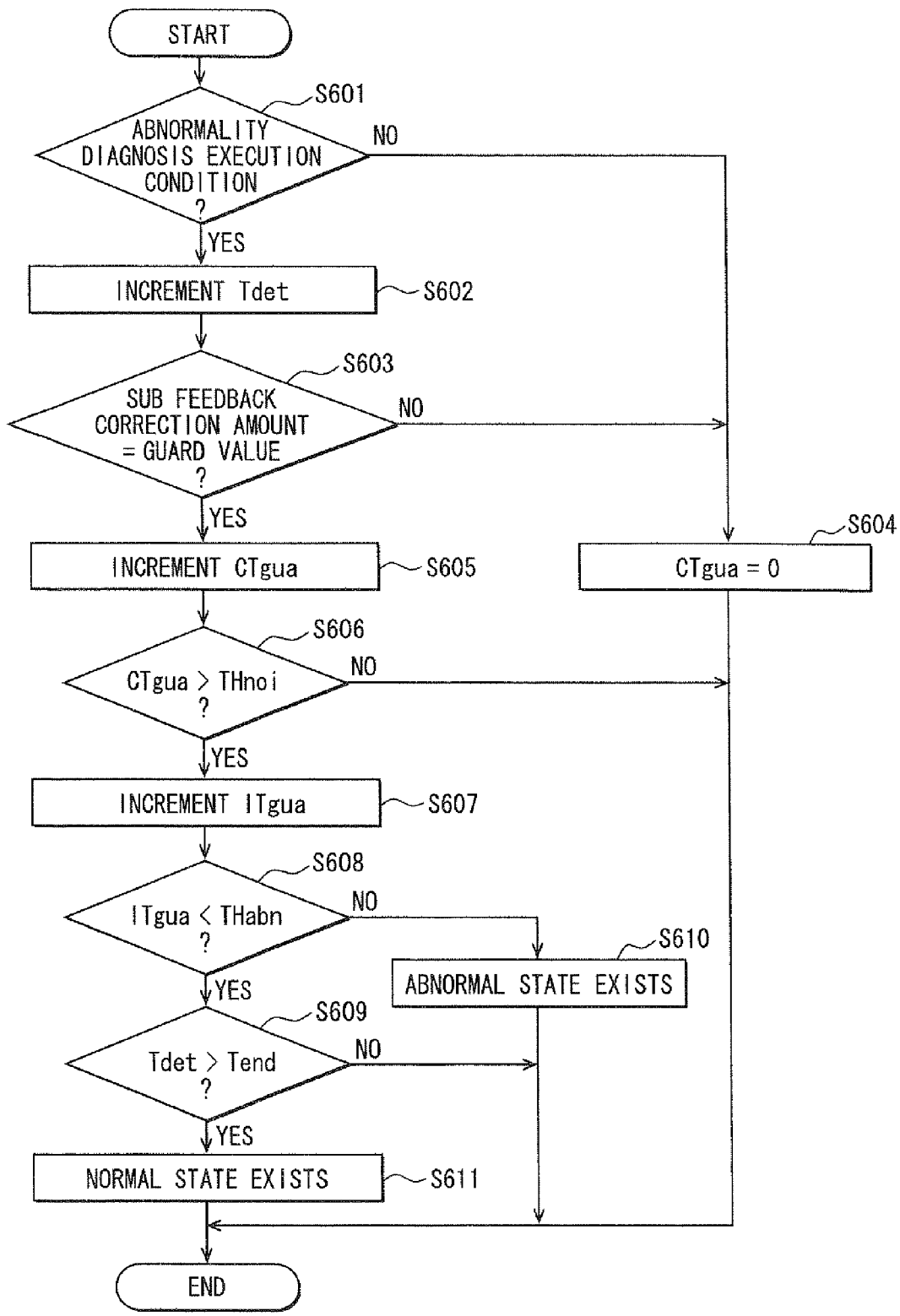
FIG. 7 is a flowchart illustrating a processing flow of an abnormality diagnosis routine according to a sixth embodiment of the present invention.

In the abnormality diagnosis routine of FIG. 7, first in S601, it is determined whether the abnormality diagnosis execution condition is satisfied. If it is determined in S601 that the abnormality diagnosis execution condition is not satisfied, the process proceeds to S604, in which the continuous guard time CTgua is reset to or maintained at 0.

If it is determined in S601 that the abnormality diagnosis execution condition is satisfied, the process proceeds to S602. In S602, the count value of the determination time counter Tdet for determining the abnormality diagnosis period is incremented by a specified time. Then, the process proceeds to S603, in which it is determined whether the sub feedback correction amount is guarded with the guard value (i.e., whether the sub feedback correction amount=the guard value). If it is determined in S603 that the sub feedback correction amount is not guarded with the guard value, the process proceeds to S604, in which the continuous guard time CTgua is reset to or maintained at 0.

If it is determined in S603 that the sub feedback correction amount is guarded with the guard value, the process proceeds to S605, in which the continuous guard time CTgua is incremented by a specified time. Then, the process proceeds to S606, in which it is determined whether the continuous guard time CTgua has exceeded the noise determination value THnoi. Thus, it is determined whether the sub feedback correction amount has been continuously guarded with the guard value for a predetermined period (i.e., a period in which the continuous guard time CTgua exceeds the noise determination value THnoi).

When it is determined in S606 that the continuous guard time CTgua is equal to or smaller than the noise determination value THnoi, that is, when the state where the sub feedback correction amount is guarded with the guard value is eliminated within a period shorter than the predetermined period, it is determined that there exists a state where the sub feedback amount is temporarily guarded with the guard value due to temporary deviation of the downstream air-fuel ratio A/Fd caused by a noise superimposed on the output of the downstream oxygen sensor 24 or a transition (i.e., change in the operation state). Then, the routine is ended without performing the processing from S607 Thus, the integration processing for calculating the integrated guard time ITgua is prohibited.

When it is determined in S606 that the continuous guard time CTgua has exceeded the noise determination value THnoi, that is, when the sub feedback correction amount has been guarded with the guard value continuously for the predetermined period, it is determined that there exists a state where the sub feedback correction amount is guarded with the guard value because of the deviation in the downstream air-fuel ratio A/Fd due to the air-fuel ratio variation among the cylinders, and the process proceeds to S607. In S607, the integrated guard time ITgua is incremented by a specified time (for example, a time corresponding to the calculation cycle of the routine of FIG. 7). Thus, the integrated guard time ITgua is obtained by integrating the time in which the sub feedback correction amount is guarded with the guard value. Thus, the integration processing for calculating the integrated guard time ITgua is started after the sub feedback correction amount is guarded with the guard value continuously for the predetermined period in the abnormality diagnosis period.

As the exhaust gas purification rate of the catalyst 22 deteriorates more due to the variation in the air-fuel ratio among the cylinders, the frequency of occurrence of the state where the sub feedback correction amount is guarded with the guard value in the abnormality diagnosis period increases. Therefore, the integrated guard time ITgua calculated by integrating the time in which the sub feedback correction amount is guarded with the guard value in the abnormality diagnosis period serves as the parameter accurately reflecting the degradation degree of the actual exhaust gas purification rate.

Then, the process proceeds to S608, in which it is determined whether the integrated guard time ITgua is smaller than the abnormality determination value THabn. If it is determined that the integrated guard time ITgua is smaller than the abnormality determination value THabn, the process proceeds to S609, in which it is determined whether the count value of the determination time counter Tdet has exceeded the end determination value Tend.

If it is determined in S609 that the count value of the determination time counter Tdet has not exceeded the end determination value Tend, the process returns to S601. Thus, the processing for obtaining the integrated guard time ITgua by integrating the time in which the sub feedback correction amount is guarded with the guard value is repeated.

Thereafter, when it is determined in S608 that the integrated guard time ITgua is equal to or greater than the abnormality determination value THabn, the process proceeds to S610. In S610, it is determined that there exists the abnormal state where the exhaust gas purification rate is deteriorated by the air-fuel ratio variation among the cylinders (i.e., the state where the control center of the main feedback control has shifted).

If it is determined in S609 that the count value of the determination time counter Tdet has exceeded the end determination value Tend while it is not determined in S608 that the integrated guard time ITgua is equal to or greater than the abnormality determination value THabn, it is determined that the abnormality diagnosis period has expired, and the process proceeds to S611, in which it is determined that there exists the normal state (i.e., that there exists no abnormal state where the exhaust gas purification rate is deteriorated by the air-fuel ratio variation among the cylinders).

According to the above-described sixth embodiment, the integrated guard time ITgua is obtained by integrating the time in which the sub feedback correction amount is guarded with the guard value. The integrated guard time ITgua is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders. As a result, the abnormal state where the exhaust gas purification rate is deteriorated by the air-fuel ratio variation among the cylinders can be detected in an early stage.

According to the sixth embodiment, when it is determined that the continuous guard time CTgua is equal to or smaller than the noise determination value THnoi, that is, when the state where the sub feedback correction amount is guarded with the guard value is eliminated within a period shorter than the predetermined period, it is determined that there exists the state where the sub feedback amount is temporarily guarded with the guard value due to the temporary deviation of the downstream air-fuel ratio A/Fd caused by a noise superimposed on the output of the downstream oxygen sensor 24 or the transition (i.e., change in the operation state). Thus, the integration processing for calculating the integrated guard time ITgua is prohibited. When it is determined that the continuous guard time CTgua has exceeded the noise determination value THnoi, that is, when the sub feedback correction amount is guarded with the guard value continuously for the predetermined period, it is determined that there exists the state where the sub feedback amount is guarded with the guard value because of the deviation of the downstream air-fuel ratio A/Fd caused by the air-fuel ratio variation among the cylinders. Thus, the integration processing for calculating the integrated guard time ITgua is started. Accordingly, the integrated guard time ITgua can be accurately calculated without being influenced by the noise or the transition.

Next, a seventh embodiment of the present invention will be described with reference to FIG. 8, focusing on differences from the fifth embodiment.

In the seventh embodiment, an abnormality diagnosis routine of FIG. 8 mentioned in detail later is performed. Thus, a continuous intake air quantity CQair (as the deterioration degree of the exhaust gas purification rate) is calculated by integrating the intake air quantity Qair during a period in which the sub feedback correction amount is continuously guarded with the guard value. The continuous intake air quantity CQair is compared with an abnormality determination value THabn to determine whether there exists the abnormal state where the exhaust gas purification rate is deteriorated by the air-fuel ratio variation among the cylinders (i.e., the state where the control center of the main feedback control has shifted).

Figure 8:
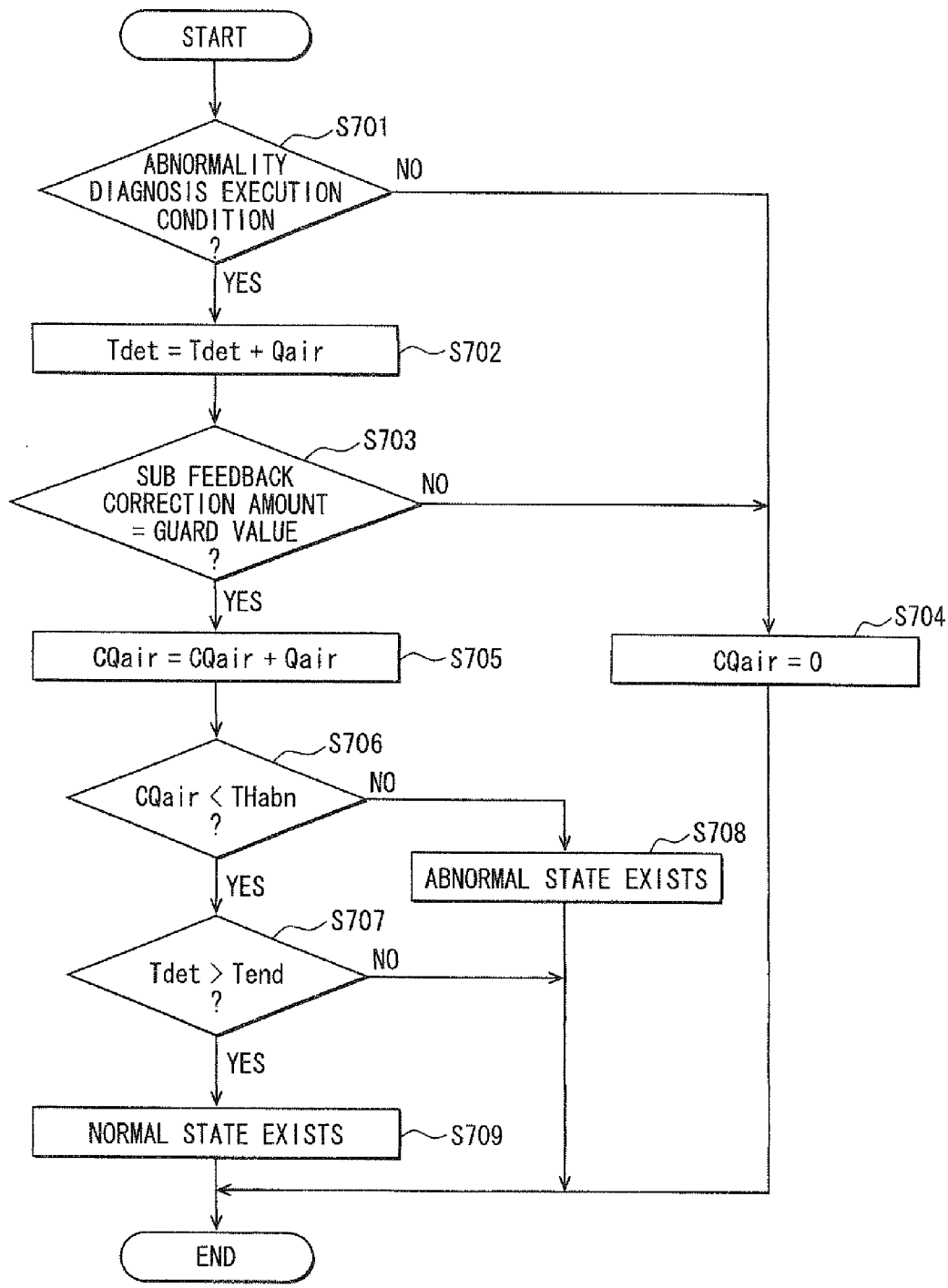
FIG. 8 is a flowchart illustrating a processing flow of an abnormality diagnosis routine according to a seventh embodiment of the present invention.

In the abnormality diagnosis routine of FIG. 8, first in S701, it is determined whether the abnormality diagnosis execution condition is satisfied. If it is determined in S701 that the abnormality diagnosis execution condition is not satisfied, the process proceeds to S704, in which the continuous intake air quantity CQair is reset to or maintained at 0.

If it is determined in S701 that the abnormality diagnosis execution condition is satisfied, the process proceeds to S702. In S702, the count value of the determination time counter Tdet for determining the abnormality diagnosis period is incremented by the present intake air quantity Qair. Then, the process proceeds to S703, in which it is determined whether the sub feedback correction amount is guarded with the guard value (i.e., whether the sub feedback correction amount=the guard value). If it is determined in S703 that the sub feedback correction amount is not guarded with the guard value, the process proceeds to S704, in which the continuous intake air quantity CQair is reset to or maintained at 0.

If it is determined in S703 that the sub feedback correction amount is guarded with the guard value, the process proceeds to S705, in which the continuous intake air quantity CQair is updated by integrating the present intake air quantity Qair to the previous continuous intake air quantity CQair. Thus, the continuous intake air quantity CQair is calculated by integrating the intake air quantity Qair during the period in which the sub feedback correction amount is continuously guarded with the guard value.

The emission discharge quantity changes in accordance with the time in which the sub feedback correction amount is guarded with the guard value and the intake air quantity Qair (that is, the exhaust discharge quantity). Therefore, the continuous intake air quantity CQair calculated by integrating the intake air quantity Qair during the period in which the sub feedback correction amount is continuously guarded with the guard value serves as the parameter accurately reflecting the actual emission discharge quantity.

Then, the process proceeds to S706, in which it is determined whether the continuous intake air quantity CQair is smaller than the abnormality determination value THabn. If it is determined that the continuous intake air quantity CQair is smaller than the abnormality determination value THabn, the process proceeds to S707, in which it is determined whether the count value of the determination time counter Tdet has exceeded the end determination value Tend.

If it is determined in S707 that the count value of the determination time counter Tdet has not exceeded the end determination value Tend, the process returns to S701. Thus, the processing for calculating the continuous intake air quantity CQair by integrating the intake air quantity Qair during the period in which the sub feedback correction amount is continuously guarded with the guard value is repeated.

Thereafter, when it is determined in S706 that the continuous intake air quantity CQair is equal to or greater than the abnormality determination value THabn, the process proceeds to S708. In S708, it is determined that there exists the abnormal state where the exhaust gas purification rate is deteriorated by the air-fuel ratio variation among the cylinders (i.e., the state where the control center of the main feedback control has shifted).

If it is determined in S707 that the count value of the determination time counter Tdet has exceeded the end determination value Tend while it is not determined in S706 that the continuous intake air quantity CQair is equal to or greater than the abnormality determination value THabn, it is determined that the abnormality diagnosis period has expired, and the process proceeds to 5709, in which it is determined that there exists the normal state (i.e., that there exists no abnormal state where the exhaust gas purification rate is deteriorated by the air-fuel ratio variation among the cylinders).

According to the above-described seventh embodiment, the continuous intake air quantity CQair is calculated by integrating the intake air quantity Qair during the period in which the sub feedback correction amount is continuously guarded with the guard value. The continuous intake air quantity CQair is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders and the emission discharge quantity has actually increased. As a result, the abnormal state where the exhaust gas purification rate is deteriorated by the air-fuel ratio variation among the cylinders can be detected in an early stage.

Next, an eighth embodiment of the present invention will be described with reference to FIG. 9, focusing on differences from the fifth embodiment.

In the eighth embodiment, an abnormality diagnosis routine of FIG. 9 mentioned in detail later is performed. Thus, an integrated intake air quantity IQair (as the deterioration degree of the exhaust gas purification rate) is calculated by integrating the intake air quantity Qair during a time in which the sub feedback correction amount is guarded with the guard value in a predetermined abnormality diagnosis period. The integrated intake air quantity IQair is compared with an abnormality determination value THabn to determine whether there exists the abnormal state where the exhaust gas purification rate is deteriorated by the air-fuel ratio variation among the cylinders (i.e., the state where the control center of the main feedback control has shifted).

Figure 9:
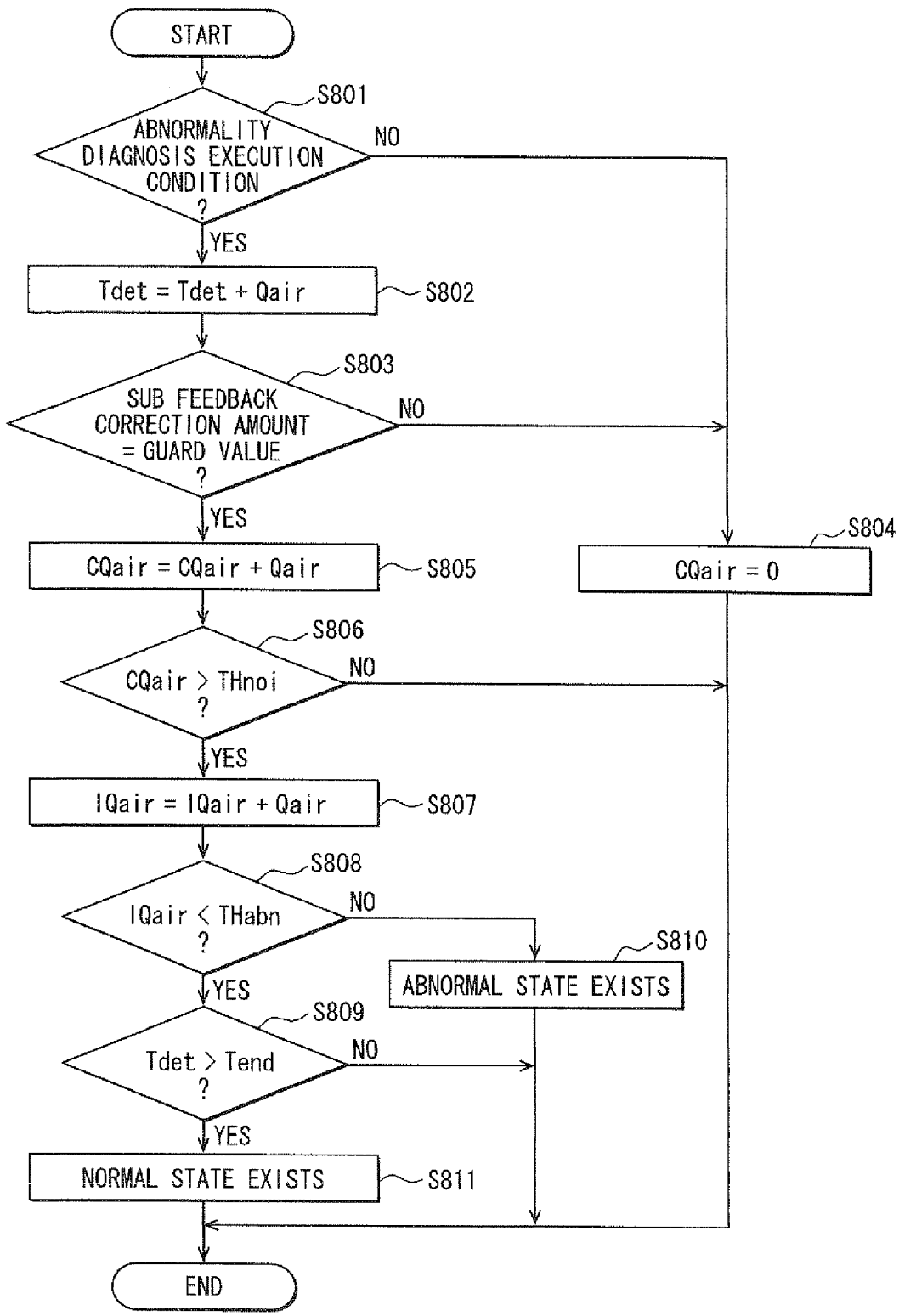
FIG. 9 is a flowchart illustrating a processing flow of an abnormality diagnosis routine according to an eighth embodiment of the present invention.

In the abnormality diagnosis routine of FIG. 9, first in S801, it is determined whether the abnormality diagnosis execution condition is satisfied. If it is determined in S801 that the abnormality diagnosis execution condition is not satisfied, the process proceeds to S804, in which the continuous intake air quantity CQair is reset to or maintained at 0.

If it is determined in S801 that the abnormality diagnosis execution condition is satisfied, the process proceeds to S802. In S802, the count value of the determination time counter Tdet for determining the abnormality diagnosis period is incremented by the present intake air quantity Qair. Then, the process proceeds to S803, in which it is determined whether the sub feedback correction amount is guarded with the guard value (i.e., whether the sub feedback correction amount=the guard value). If it is determined in S803 that the sub feedback correction amount is not guarded with the guard value, the process proceeds to S804, in which the continuous intake air quantity CQair is reset to or maintained at 0.

If it is determined in S803 that the sub feedback correction amount is guarded with the guard value, the process proceeds to S805, in which the continuous intake air quantity CQair is updated by integrating the present intake air quantity Qair to the previous continuous intake air quantity CQair.

Then, the process proceeds to S806, in which it is determined whether the continuous intake air quantity CQair has exceeded a noise determination value THnoi. Thus, it is determined whether the sub feedback correction amount has been guarded with the guard value continuously for a predetermined period (i.e., a period in which the continuous intake air quantity CQair exceeds the noise determination value THnoi).

When it is determined in S806 that the continuous intake air quantity CQair is equal to or smaller than the noise determination value THnoi, that is, when the state where the sub feedback correction amount is guarded with the guard value is eliminated within a period shorter than the predetermined period, it is determined that there exists the state where the sub feedback amount is temporarily guarded with the guard value due to the temporary deviation of the downstream air-fuel ratio A/Fd caused by a noise superimposed on the output of the downstream oxygen sensor 24 or the transition (i.e., change in the operation state). Then, the routine is ended without performing the processing from S807. Thus, the integration processing for calculating the integrated intake air quantity IQair is prohibited.

When it is determined in S806 that the continuous intake air quantity CQair has exceeded the noise determination value THnoi, that is, when the sub feedback correction amount has been guarded with the guard value continuously for the predetermined period, it is determined that there exists the state where the sub feedback amount is guarded with the guard value because of the deviation of the downstream air-fuel ratio A/Fd caused by the air-fuel ratio variation among the cylinders. Then, the process proceeds to S807, in which the integrated intake air quantity IQair is updated by integrating the present intake air quantity Qair to the previous integrated intake air quantity IQair. Thus, the integration processing for calculating the integrated intake air quantity IQair is started after the sub feedback correction amount is guarded with the guard value continuously for the predetermined period in the abnormality diagnosis period.

The emission discharge quantity changes in accordance with the time in which the sub feedback correction amount is guarded with the guard value and the intake air quantity Qair (that is, the exhaust discharge quantity). Therefore, the integrated intake air quantity IQair calculated by integrating the intake air quantity Qair during the period in which the sub feedback correction amount is guarded with the guard value serves as the parameter accurately reflecting the actual emission discharge quantity.

Then, the process proceeds to S808, in which it is determined whether the integrated intake air quantity IQair is smaller than the abnormality determination value THabn. If it is determined that the integrated intake air quantity IQair is smaller than the abnormality determination value THabn, the process proceeds to S809, in which it is determined whether the count value of the determination time counter Tdet has exceeded the end determination value Tend.

If it is determined in S809 that the count value of the determination time counter Tdet has not exceeded the end determination value Tends the process returns to S801. Thus, the processing for calculating the integrated intake air quantity IQair by integrating the intake air quantity Qair during the period in which the sub feedback correction amount is guarded with the guard value is repeated.

Then, when it is determined in S808 that the integrated intake air quantity IQair is equal to or greater than the abnormality determination value THabn, the process proceeds to S810. In S810, it is determined that there exists the abnormal state where the exhaust gas purification rate is deteriorated by the air-fuel ratio variation among the cylinders (i.e. the state where the control center of the main feedback control has shifted).

If it is determined in S809 that the count value of the determination time counter Tdet has exceeded the end determination value Tend while it is not determined in S808 that the integrated intake air quantity IQair is equal to or greater than the abnormality determination value THabn, it is determined that the abnormality diagnosis period has expired, and the process proceeds to S811, in which it is determined that there exists the normal state (i.e., that there exists no abnormal state where the exhaust gas purification rate is deteriorated by the air-fuel ratio variation among the cylinders).

According to the above-described eighth embodiment, the integrated intake air quantity IQair is calculated by integrating the intake air quantity Qair during the time in which the sub feedback correction amount is guarded with the guard value in the abnormality diagnosis period. The integrated intake air quantity IQair is compared with the abnormality determination value THabn to determine whether there exists the abnormal state where the exhaust gas purification rate is deteriorated by the air-fuel ratio variation among the cylinders (i.e., the state where the control center of the main feedback control has shifted). Accordingly, it can be accurately determined whether there exists the abnormal state where the exhaust gas purification rate is deteriorated by the air-fuel ratio variation among the cylinders and the emission discharge quantity has actually increased. As a result, the abnormal state where the exhaust gas purification rate is deteriorated by the air-fuel ratio variation among the cylinders can be detected in an early stage.

According to the eighth embodiment, when it is determined that the continuous intake air quantity CQair is equal to or smaller than the noise determination value THnoi, that is, when the state where the sub feedback correction amount is guarded with the guard value is eliminated within a period shorter than the predetermined period, it is determined that there exists the state where the sub feedback amount is temporarily guarded with the guard value due to the temporary deviation of the downstream air-fuel ratio A/Fd caused by a noise superimposed on the output of the downstream oxygen sensor 24 or the transition (i.e., change in the operation state). Thus, the integration processing for calculating the integrated intake air quantity IQair is prohibited. When it is determined that the continuous intake air quantity CQair has exceeded the noise determination value THnoi, that is, when the sub feedback correction amount has been guarded with the guard value continuously for the predetermined period, it is determined that there exists the state where the sub feedback amount is guarded with the guard value because of the deviation of the downstream air-fuel ratio A/Fd caused by the air-fuel ratio variation among the cylinders. Thus, the integration processing for calculating the integrated intake air quantity IQair is started. Accordingly, the integrated intake air quantity IQair can be accurately calculated without being influenced by the noise or the transition.

In each of the first to fourth embodiments, the present invention is applied to the system that performs the main feedback control based on the output of the upstream air-fuel ratio sensor 23 and the sub feedback control based on the output of the downstream air-fuel ratio sensor 24. Alternatively, the present invention may be applied to a system that has the downstream oxygen sensor 24 and a downstream air-fuel ratio sensor for monitoring provided downstream of the catalyst 22 and that performs the main feedback control based on the output of the upstream air-fuel ratio sensor 23 and the sub feedback control based on the output of the downstream oxygen sensor 24. Thus, the deterioration degree of the exhaust gas purification rate may be determined based on an integrated value of a deviation amount of the air-fuel ratio, which is sensed with the downstream air-fuel ratio sensor for monitoring, from the target air-fuel ratio, and it may be determined whether there exists the abnormal state where the exhaust gas purification rate is deteriorated by the air-fuel ratio variation among the cylinders based on the deterioration degree of the exhaust gas purification rate.

In the first to eighth embodiments, the present invention is applied to the system that has the air-fuel ratio sensor provided upstream of the catalyst 22. Alternatively, the present invention may be applied to a system that has an oxygen sensor provided upstream of the catalyst 22.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An abnormality diagnosis device of an internal combustion engine that has a catalyst provided in an exhaust passage of the internal combustion engine for purifying exhaust gas, an upstream sensor provided upstream of the catalyst for sensing an air-fuel ratio or a rich/lean state of the exhaust gas and a downstream sensor provided downstream of the catalyst for sensing the rich/lean state of the exhaust gas and that performs main feedback control for correcting a supply air-fuel ratio based on an output of the upstream sensor and sub feedback control for correcting a control amount related to the main feedback control based on an output of the downstream sensor, the abnormality diagnosis device comprising:
a control unit, including a computer processor, the control unit being configured at least to perform:
an exhaust gas purification rate deterioration degree determination for determining a deterioration degree of an exhaust gas purification rate based on a time in which a sub feedback correction amount used in the sub feedback control is guarded with a predetermined guard value; and
an abnormality diagnosis for determining whether there exists an abnormal state where the exhaust gas purification rate is deteriorated due to a variation in the air-fuel ratio among cylinders based on the deterioration degree of the exhaust gas purification rate determined by the exhaust gas purification rate deterioration degree determination, wherein
the exhaust gas purification rate deterioration degree determination calculates the deterioration degree of the exhaust gas purification rate by integrating an intake air quantity during a period, in which the sub feedback correction amount is continuously guarded with the guard value, and
the abnormality diagnosis determines whether there exists the abnormal state when the catalyst and both of the upstream sensor and the downstream sensor are in normal condition.

2. The abnormality diagnosis device as in claim 1, wherein the exhaust gas purification rate deterioration degree determination calculates the deterioration degree of the exhaust gas purification rate by integrating the intake air quantity during a period, in which the sub feedback correction amount is guarded with the guard value, in a predetermined abnormality diagnosis period.

3. The abnormality diagnosis device as in claim 1, wherein the exhaust gas purification rate deterioration degree determination starts integration processing for calculating the deterioration degree of the exhaust gas purification rate after the sub feedback correction amount is guarded with the guard value continuously for a predetermined period in the abnormality diagnosis period.

4. A method of diagnosing an abnormality an internal combustion engine that has a catalyst provided in an exhaust passage of the internal combustion engine for purifying exhaust gas, an upstream sensor provided upstream of the catalyst for sensing an air-fuel ratio or a rich/lean state of the exhaust gas and a downstream sensor provided downstream of the catalyst for sensing the rich/lean state of the exhaust gas and that performs main feedback control for correcting a supply air-fuel ratio based on an output of the upstream sensor and sub feedback control for correcting a control amount related to the main feedback control based on an output of the downstream sensor, the method comprising:
determining a deterioration degree of an exhaust gas purification rate based on a time in which a sub feedback correction amount used in the sub feedback control is guarded with a predetermined guard value; and
determining whether there exists an abnormal state where the exhaust gas purification rate is deteriorated due to a variation in the air-fuel ratio among cylinders based on the determined deterioration degree of the exhaust gas purification rate, wherein
the deterioration degree of the exhaust gas purification rate is calculated by integrating an intake air quantity during a period, in which the sub feedback correction amount is continuously guarded with the guard value, and
whether there exists the abnormal state is determined when the catalyst and both of the upstream sensor and the downstream sensor are in normal condition.

5. The method as in claim 4, wherein the deterioration degree of the exhaust gas purification rate is calculated by integrating the intake air quantity during a period, in which the sub feedback correction amount is guarded with the guard value, in a predetermined abnormality diagnosis period.

6. The method as in claim 4, wherein integration processing for calculating the deterioration degree of the exhaust gas purification rate is started after the sub feedback correction amount is guarded with the guard value continuously for a predetermined period in the abnormality diagnosis period.

\* \* \* \* \*